(12) United States Patent
Wang et al.

(10) Patent No.: US 7,164,435 B2
(45) Date of Patent: Jan. 16, 2007

(54) VIDEOCONFERENCING SYSTEM

(75) Inventors: Ah-Jee Wang, Fountain Valley, CA (US); Steven Joe, Fountain Valley, CA (US)

(73) Assignee: D-Link Systems, Inc., Fountain Valley, CA (US)

( * ) Notice: Subject to any disclaimer, the term of this patent is extended or adjusted under 35 U.S.C. 154(b) by 609 days.

(21) Appl. No.: 10/750,126

(22) Filed: Dec. 31, 2003

(65) Prior Publication Data

US 2004/0218034 A1    Nov. 4, 2004

Related U.S. Application Data

(60) Provisional application No. 60/446,452, filed on Feb. 10, 2003.

(51) Int. Cl.
H04N 7/14    (2006.01)

(52) U.S. Cl. ............................ 348/14.08; 348/14.01; 348/14.03

(58) Field of Classification Search .. 348/14.01–14.09, 348/14.1, 14.11, 14.12, 14.13; 370/260, 370/261, 352; 709/204
See application file for complete search history.

(56) References Cited

U.S. PATENT DOCUMENTS

| | | | |
|---|---|---|---|
| 4,533,943 A | 8/1985 | Poirier | |
| 5,524,141 A | 6/1996 | Braun et al. | |
| 5,574,778 A | 11/1996 | Ely et al. | |
| 5,835,575 A | 11/1998 | Stoller et al. | |
| 5,841,469 A | 11/1998 | Freeman et al. | |
| 5,847,752 A | 12/1998 | Sebestyen | |
| 6,073,214 A | 6/2000 | Fawcett | |
| 6,151,643 A | 11/2000 | Cheng et al. | |
| 6,178,446 B1 | 1/2001 | Gerszberg et al. | |
| 6,212,554 B1 | 4/2001 | Roskowski | |
| 6,222,520 B1 | 4/2001 | Gerszberg et al. | |
| 6,256,668 B1 | 7/2001 | Slivka et al. | |
| 6,311,185 B1 | 10/2001 | Markowitz et al. | |
| 6,320,606 B1 | 11/2001 | Wada | |
| 6,351,279 B1 | 2/2002 | Sawyer | |
| 6,360,266 B1 | 3/2002 | Pettus | |
| 6,366,913 B1 | 4/2002 | Fitler et al. | |
| 6,377,948 B1 | 4/2002 | Kikuchi et al. | |
| 6,396,510 B1 | 5/2002 | Pendse et al. | |
| 6,396,531 B1 | 5/2002 | Gerszberg et al. | |
| 6,430,596 B1 | 8/2002 | Day | |
| 6,438,594 B1 | 8/2002 | Bowmann-Amuah | |
| 6,457,076 B1 | 9/2002 | Cheng et al. | |
| 6,463,443 B1 | 10/2002 | Thorner et al. | |

(Continued)

FOREIGN PATENT DOCUMENTS

JP    408263409 A    *  10/1996

(Continued)

*Primary Examiner*—Melur Ramakrishnaiah
(74) *Attorney, Agent, or Firm*—Duncan Palmatier

(57) ABSTRACT

A videoconferencing system uses a stand-alone video/audio transcapture module with an H.323-compliant broadband Internet connection through a server to conduct real-time videoconferencing. The system provides directory service to work behind Network Address Translation systems by means of backend servers that use Lightweight Directory Assistance Protocol servers to map numbers to IP addresses. The system further incorporates an automatic firmware update service to provide updated firmware updates each time the transcapture module is rebooted. The system also provides an automatic commercial download service to provide module specific bannerization capability, so that each transcapture module can receive directed commercials.

1 Claim, 21 Drawing Sheets

U.S. PATENT DOCUMENTS

| | | |
|---|---|---|
| 6,470,357 B1 | 10/2002 | Garcia et al. |
| 6,480,900 B1 | 11/2002 | Habert |
| 6,498,612 B1 | 12/2002 | Brown et al. |
| 6,498,797 B1 | 12/2002 | Anerousis et al. |
| 6,510,236 B1 | 1/2003 | Crane et al. |

| | | | |
|---|---|---|---|
| 2002/0149672 A1 * | 10/2002 | Clapp et al. | 348/14.09 |

FOREIGN PATENT DOCUMENTS

| | | | |
|---|---|---|---|
| JP | 410285569 A | * | 10/1998 |

* cited by examiner

VIDEOCONFERENCING SYSTEM

CROSS REFERENCE TO RELATED APPLICATIONS

This application claims priority under 35 U.S.C. § 119(e) from provisional patent Application No. 60/446,452, filed Feb. 10, 2003. The 60/446,452 Application is incorporated herein by reference.

BACKGROUND OF THE INVENTION

1. Field of the Invention

The present invention relates to a system for videoconferencing with a stand-alone transcapture module over a broadband Internet connection and through a server or servers providing directory, IP addressing, firmware updating, and automatic commercial downloading services.

2. Discussion of Prior Art

In 1996, International Telecommunications Union ("ITU") approved the H.323 protocol as a standard, to promote compatibility in videoconference transmissions over networks. The ITU H.323 protocol advanced video compression technology and maximized the image and audio quality within available bandwidth. H.323 was originally promoted as a way to provide consistency in audio, video and data packet transmissions in the event that a Local Area Network ("LAN") did not provide guaranteed Quality of Service ("QoS"). H.323 matured to become the standard for interoperability in audio, video and data transmissions, because it addresses call control and management for both point-to-point and multipoint conferences as well as gateway administration of media traffic, bandwidth and user participation.

The fast-growing availability of broadband infrastructure and Digital Subscriber Lines ("DSL"), as well as the xDSL-progeny, including HDSL, SDSL, ADSL, and VDSL, made for greater digital capacity and availability. With this infrastructure, a demand for easy-to-use videoconferencing systems has arisen. Most commercially available systems are designed for use with an existing computer system. In some of such products, a video camera is connected to a personal computer ("PC") and the user makes and receives videoconference calls through the computer. For users who do not a computer or who find computers hard to use, these systems pose significant consumer problems. Even for users skilled with computers, a simple device, more like a telephone than a computer, offers advantages of simplicity and ease. For example, a stand-alone videoconferencing device can be used without booting-up a computer to open the appropriate program. Similarly, computer-reliant videoconferencing systems must be located near a computer so the participants can see other parties on the computer monitor. However, most computers are space-consuming appliances. Traditional monitors are large and heavy, and even flat-screens take up substantial space. In addition, computers usually require separate keyboards, mice, computer cases or towers, speakers, printers and other peripheral devices, all of which take up space and make a computer difficult to move. Even laptop computers can be awkward to set-up and move. Therefore, what is needed is a device that provides broadband Internet videoconferencing without an associated computer.

The H.323 standard provides practical broadband Internet-based videoconferencing. However, the H.323 Protocol requires the use of complicated and user-unfriendly IP addresses. Directory services have been proposed to facilitate conferences. For example, U.S. Pat. No. 6,396,510, discloses a method and apparatus for scheduling a multipoint electronic conference with a "control service". However, existing services can be complicated and difficult to use. As noted above, some potential videoconferencing users are reluctant to interact with computers. Therefore, a system is needed that combines a stand-alone videoconferencing device with services that make it simple to use. With respect to H.323 Protocol videoconferencing over a broadband Internet connection, such a service would simplify the IP addressing requirements needed to initiate the calls.

Similarly, in relying on IP addresses, the H.323 Protocol poses problems for videoconferencing devices that are connected to the Internet through gateways, routers or firewalls ("GRF"). These devices are common network infrastructures in businesses and used with increasing frequency in residential settings. The GRF typically employs Dynamic Host Configuration Protocol ("DHCP") and Network Address Translation ("NAT") services with private IP addresses. To make a videoconference call outside a private network, the H.323 Protocol requires a point-to-point connection based on IP addresses. However, when an end-point is behind a GRF, it may not be accessible from a public network or the Internet. To provide a simple and effective system for videoconferences, a stand-alone device should have a service capable of accessing an end-point behind a GRF.

A videoconferencing system should be dynamic and capable of automatic updates to its firmware. Thus, such a system should have the capability of engaging a service in order to receive firmware updates. Existing systems require use of a computer or user-directed updating, which poses problems of complexity. A stand-alone videoconferencing system should provide an automatic firmware update service.

As videoconferencing becomes more common, it provides a user-friendly platform capable of providing commercial and other information to a user. Existing videoconferencing do not provide such services. Therefore, a stand-alone videoconferencing device should be capable of interacting with an automatic commercial download service.

SUMMARY OF THE INVENTION

The videoconferencing system of the present invention uses a stand-alone video/audio transcapture module that does not need a computer to videoconference over the Internet, thereby greatly simplifying the previously complicated process of conducting an internet-based videoconference. The transcapture module connects a television and an International Telecommunications Union ("ITU") H.323-compliant broadband Internet connection to conduct real-time videoconferencing. Optionally, a standard telephone line can be included in the system to ensure a more private conversation. The disclosed invention uses Dynamic Host Configuration Protocol ("DHCP") for Internet Protocol ("IP") and Media Access Control ("MAC") addressing by means of Directory Service ("DS") to map addresses and work behind Network Address Translation ("NAT") systems. The Directory Service system operates either by means of a pure IP address for another endpoint device or any other H.323 endpoint, or by means of backend servers that use Lightweight Directory Assistance Protocol ("LDAP") servers to map numbers to IP addresses. It is common for users to work their intranet and broadband connections behind a Gateway/Router/Firewall ("GRF"). A GRF typically employs DHCP and NAT services with Private IP addresses. It is not possible to establish a point-to-point connection from a public network or the Internet when end-point modules are behind these GRF's. The present invention discloses a system in which the transcapture module sends a script to PIP servers to notify them that it is behind a GRF, and the PIP servers automatically map the public IP address to the private IP address. The disclosed invention further incorporates an automatic Firmware Update Service ("FUS") to provide updated firmware updates each time the transcapture module is rebooted. The present invention also discloses an Automatic Commercial Download Service ("ACDS") with the capability of interacting with the PIP server, so that the transcapture module can communicate a unique firmware code, recognizable to the PIP server. The ACDS provides module specific bannerization capability, so that each transcapture module can receive directed commercials.

Relying on the H.323 protocol, the transcapture module allows real-time, point-to-point videoconferencing and establishes communications via the Internet TCP/IP protocol IP address scheme. The transcapture module can also establish communication using a telephone dialing directory service. This service maps a telephone number to an IP address so that the user does not need to remember, or learn how to use, complicated IP addresses. The user will be automatically logged into the directory server upon start-up of the transcapture module, which will enable the server to check if the user has logged in before, and if not, to store the 10-digit "telephone" number as a new record into the directory server database. Anytime a user enters a phone number into a transcapture module and presses the "dial" button, the directory server will reference the "telephone" number in an address table, locate the IP address of the user being called and initiate a call.

The transcapture module can also be deployed in a network infrastructure that offers Dynamic Host Configuration Protocol ("DHCP") IP Addressing. DHCP is a communications protocol that lets network administrators manage centrally and automate the assignment of IP addresses in an organization's network. Using the Internet Protocol, each machine that can connect to the Internet needs a unique IP address. When an organization sets-up its computer users with a connection to the Internet, an IP address must be assigned to each machine. Without DHCP, the IP address must be entered manually at each computer and, if computers move to another location in another part of the network, a new IP address must be entered. DHCP lets the network administrator supervise and distribute IP addresses firm a central point and automatically sends a new IP address when a computer is plugged into a different place in the network. The DHCP service is dynamic in nature; the directory service of the present invention is able to map the "telephone" address to any DHCP IP address so that the transcapture module can work behind a router or Network Address Translation (NAT).

The transcapture module of the present invention, as a network appliance, can also communicate to a centralized server to update firmware automatically when a new and improved version is made available. At each start-up, the transcapture module will contact a server with a record of the latest firmware version. If new firmware is called for, a message prompt will inform the user the newer firmware is available for automated download and installation. Upon installation the transcapture module will, with the user's acceptance, perform a restart to activate the new firmware version.

The transcapture module has bannerization capability to accept an authorized, specific and unlimited commercial banner. The commercial banner is customizable and will route to a programmed matrix of commercial end systems. Upon start-up, the transcapture module will log into the directory server automatically. The individual transcapture module is identified from the data stored previously on the server against the data for the module. The module will be assigned a specific ID for processing through the directory server. Modules can be organized by this ID into groups to bannerize a group or groups to receive a specific commercial serviced while other groups will receive other service information.

These and other benefits and advantages of the present invention will become apparent through the detailed descript ion of the preferred embodiment, disclosed below.

DETAILED DESCRIPTION OF THE PREFERRED EMBODIMENTS

Figure 1:
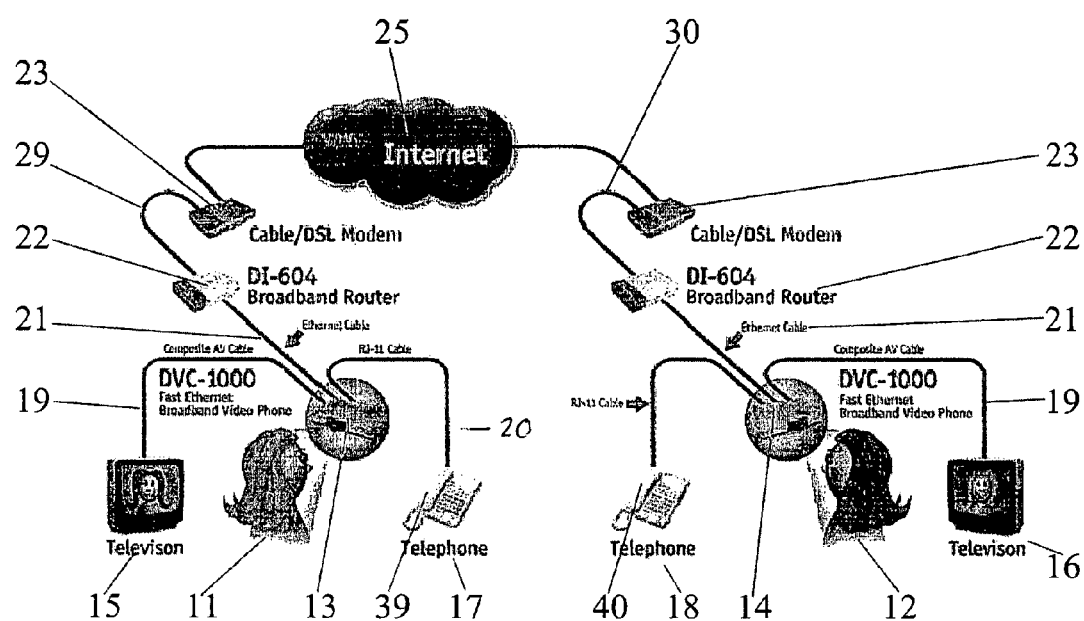
FIG. 1 is a diagram of the modular architecture showing the user components of the present invention in connection to the Internet.
Figure 3:
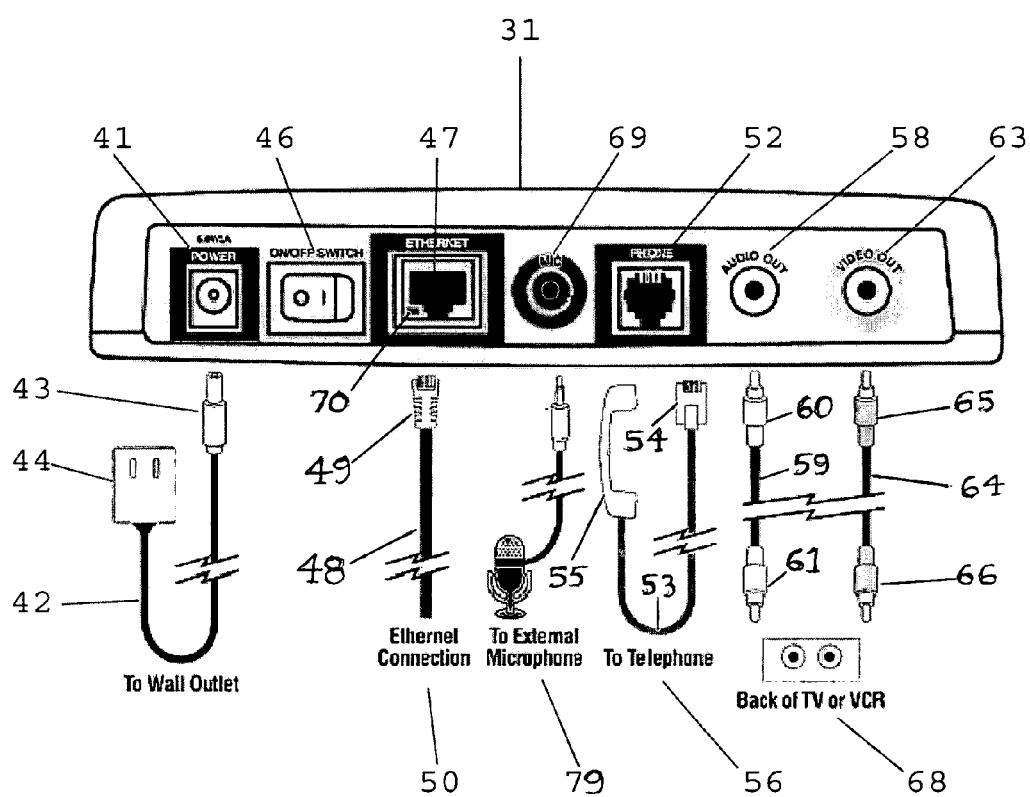
FIG. 3 is a back view of the video transcapture module, showing the multiple connectors and connection components.

FIG. 1 is a diagram of the major components of the present invention. In the preferred embodiment, a first transcapture module 13 is connected to the Internet 25 by an Ethernet cable 21 and Cable/DSL modem 23. Also connected to the transcapture module 13 are a television 15 and a telephone 17. The transcapture module 13 is a stand-alone device and does not need a computer to operate. As described in greater detail below, a telephone 17 is not necessary for the operation of the invention, but adding such a device will provide enhanced sound quality and privacy. The telephone 17 is connected to the transcapture module 13 by a standard telephone line 20. The television is connected to the transcapture module 13 through standard RCA jacks (58 and 63, as seen in FIG. 3), composite audio video ("AV") cables 19, and RCA jacks (60, 61, 65 and 66, as seen in FIG. 3). If the television lacks AV inputs, a connection can be adapted with an RF modulator (not shown) to provide AV jacks to be connected with the television's antenna terminal. Similarly, the transcapture module 13 can be connected to a computer with a video capture device (not shown) that allows input of standard composite video using RCA jacks or other appropriate connectors. The transcapture module 13 is connected to the Internet 25 through a Cable or DSL modem 23. In FIG. 1, a standard Ethernet cable 21 connects the transcapture module 13 to a broadband router 22, however a router 22 or switch or hub or firewall (not shown) are not necessary components for the operation of the invention. Such devices provide local networking and security functions. If such a device is placed between the transcapture module and the Internet 25, an additional broadband cable 29 may be required.

Figure 2:
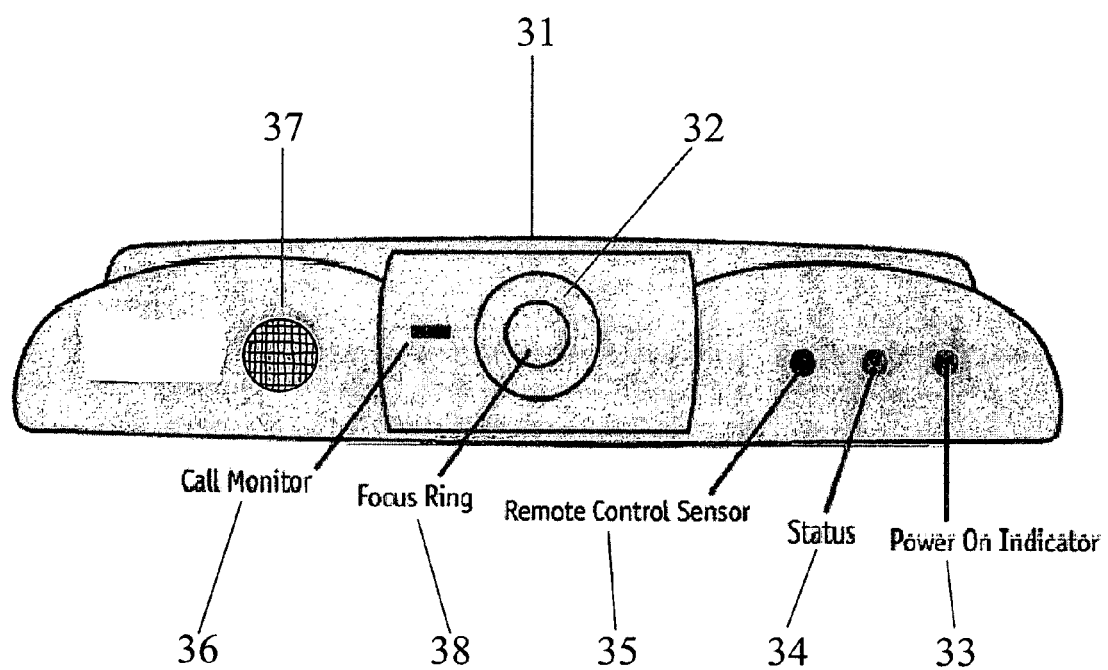
FIG. 2 is a front view of the video transcapture module.

With respect to the telephone 17 component, the connection is only between the transcapture module 13 and the standard telephone 17 unit; there is no connection to an outside telephone line. A standard telephone 17 allows a user 11 to hear conversations with a telephone handset, which may provide better audio quality. The audio component of the communication is intended to be transmitted through the audio system (not shown) of the television 15. Many commercially available televisions have only very basic audio quality, thus the telephone 15 may provide a better sound. Moreover, when audio volume is increased in a television 15, the sound will fill an entire room and may be adversely affected by external conditions. This is a particular problem for users with impaired hearing. By using a telephone 17 handset 39, the user 11 can direct incoming sound to the ear and avoid the problems of conversations broadcast from a television sound system. Moreover, many telephones provide volume controls and special audio features to assist users with hearing impairments. It will also be appreciated that a conversation conducted through a television sound system can be heard by anyone in the room where the sound system is located and sometimes by people in adjacent spaces, thereby compromising the privacy of the conversation. By providing a telephone 17, it is possible to turn off or reduce the volume of the television 15 sound system and speak only through the telephone 17 handset 39, thereby providing additional security and privacy. Similarly, the user's 11 communications can be picked up by a microphone (37 as seen in FIG. 2) in the transcapture module 13, or through the telephone handset 39. While the microphone 37 of the transcapture module 13 may pick up stray sounds in the area where it is located, and may have difficult picking up extremely low volume sounds, such as barely audible whispers, the telephone handset 39 may provide a better means to communicate such sounds and a more private means for communication.

Figure 21:
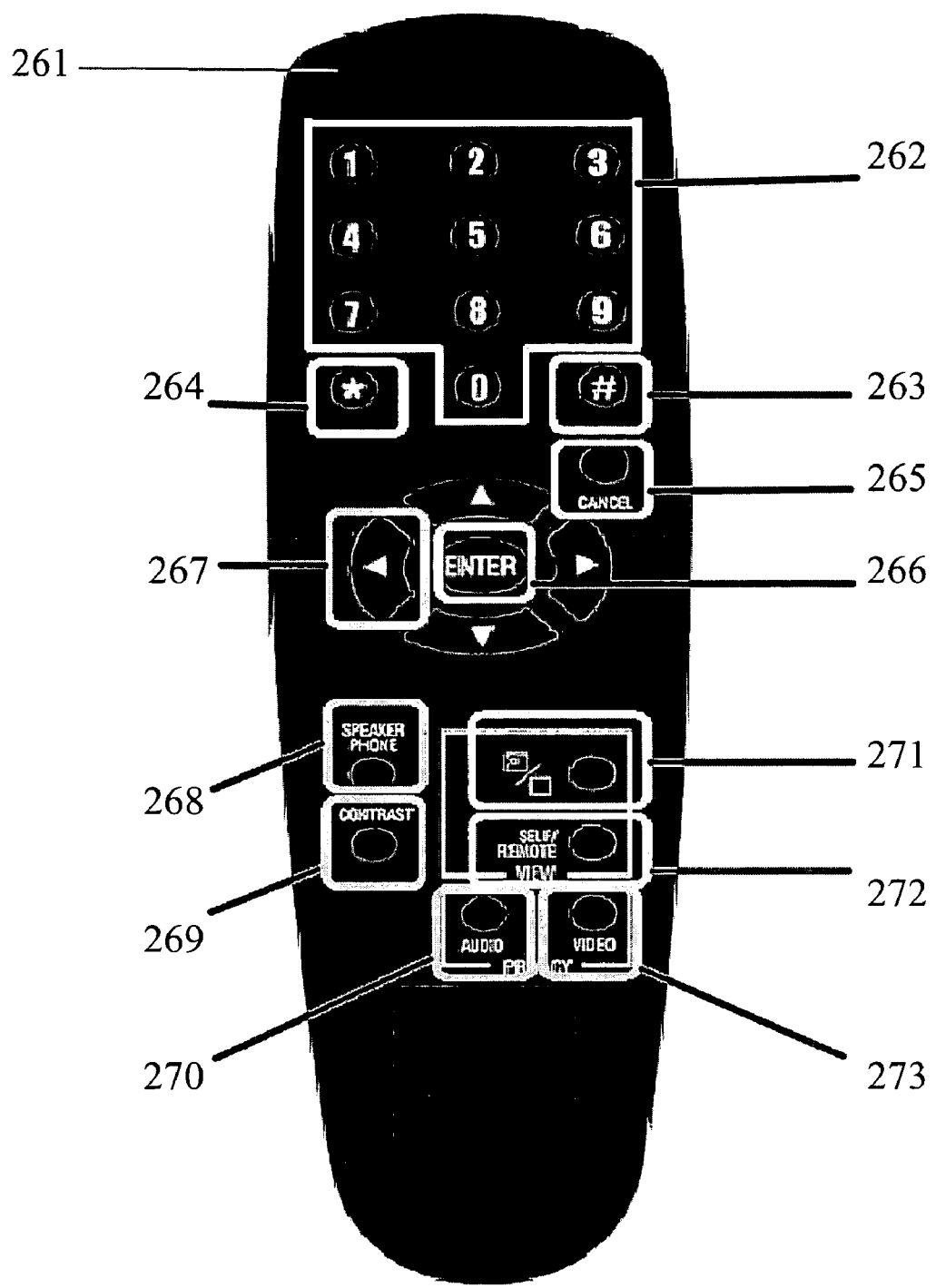
FIG. 21 is a front view of the remote control for the video transcapture module, showing the manifold selection components.

FIG. 2 shows the front of the transcapture module unit 31 of the preferred embodiment of the present invention. A microphone 37 can pick up sounds. An adjustable tilt and focus lens 32 can pick up visual images within its range. Manual articulation of the lens unit 38 allows it to be directed within a field of vision in front of the transcapture module unit 31. The lens 32 further relies on conventional auto-focus to provide a clear image of the objects in front of it. A power indicator light 33 shows that power to the transcapture module unit 31 is on. A status light 34 illuminates when the unit 31 boots up, then goes off during normal operation. The unit 31 may be operated by a remote control device (271, as seen in FIG. 21), through a remote control sensor 35. A call monitor light 36 indicates when a call is in progress and a video signal is being sent.

FIG. 3 shows the back of the transcapture module unit 31 of the preferred embodiment of the present invention. A standard power jack 43 plugs into the power port 41, through which reduced-voltage power can be transmitted from a transformer 44 and through a power cable 42. The transformer 44 connects to a standard electrical supply outlet (not shown). The unit 31 has a power switch 46 to allow it to be switched off. The broadband connection to the Internet (25, as seen in FIG. 1), is provided by an Ethernet connection 50, through an Ethernet cable 48 and RJ-45 jack 49. The Ethernet jack 49 plugs into the Ethernet port 47 of the unit 31. An activity indicator 70 is provided by an LED display to show that the transcapture module unit 31 is sending video and that a call is in progress. A link status indicator 78 shows that the network connection is established. A standard audio microphone port 69 allows an external microphone 79 to be connected to the transcapture module unit 31 to provide increased audio input performance. A telephone port 52 can receive a standard RJ-11 jack 54 for connection to a telephone 56, as discussed above. An audio port 58 receives a standard RCA jack 60, and an AV cable 59 connects through another RCA jack 61 to the appropriate port on the television or VCR 68. A video port 63 receives a standard RCA jack 65, and an AV cable 64 connects through another RCA jack 66 to the appropriate port on the television or VCR 68. As discussed above, if the television lacks RCA ports, a connection can be adapted with an RF modulator (not shown) to provide RCA jacks to be connected with the television's antenna terminal.

Referring again to FIG. 1, the first transcapture module 13 uses a DSL broadband connection to the Internet 25. A second transcapture module 14 is set up in the same way as the first 13. The second transcapture module 14 is connected to an Ethernet cable 21 and DSL modem 23, a television 16, and a telephone 18. As with the first transcapture module 13, the telephone 18 is not necessary for the operation of the invention, but adding it provides enhanced sound quality and privacy. The telephone 18 is connected to the transcapture module 14 by a standard telephone line 20. The television is connected to the transcapture module 14 by standard composite AV cables 19. The second transcapture module 14 is connected to the Internet 25 through a Cable or DSL modem 23. The second transcapture module 14 has the same configuration described above and shown in FIGS. 2 and 3.

Figure 4:
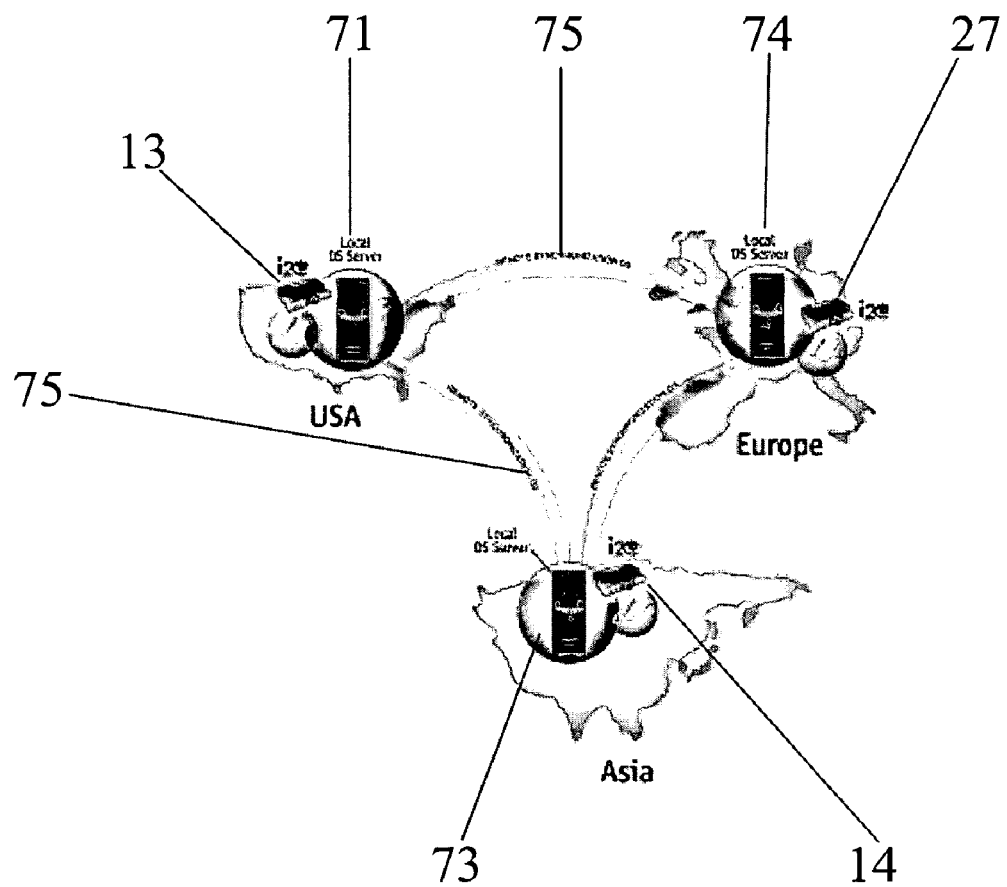
FIG. 4 is a diagram of the backend service architecture showing the local directory service servers in the remote synchronization infrastructure embodiment of the present invention.

FIG. 4 shows the preferred embodiment of the invention with local Directory Service ("DS") servers dispersed in distinct geographic regions. A transcapture module 13 in the U.S.A. is connected to a local DS server 71. The transcapture module 13 relies on the H.323 protocol to transmit and receive a real-time audio and visual signals comprising a videoconference. The H.323 protocol, approved by the ITU, established a standard for video compression and maximized the image and audio quality within available bandwidth. H.323 has become the standard for interoperability in audio, video and data transmissions, because it addresses call control and management for both point-to-point and multi-point conferences as well as gateway administration of media traffic, bandwidth and user participation. With the availability of broadband infrastructure and DSL, H.323 protocol videoconferencing has become more commonly available.

The H.323 protocol relies on an Ethernet data packet and IP address to identify any other H.323 compliant endpoint. Thus, a user 11 at a first transcapture module 13 initiates a call. The transcapture module 13 connects with the DS server 71 and transmits its own identification, as described in greater detail below, and the address of an endpoint, such as the second transcapture module 14 or an H.323 compliant endpoint using a different system, such as a personal computer ("PC") with a broadband connection. If the second transcapture module 14 is registered with any of the DS servers 71, 73 or 74, the DS server will look in a registration identification table database for the IP and MAC address of the second transcapture module 14. If the DS server identifies the MAC/IP address for the second transcapture module 14, then it will send the videoconference call to that unit. Alternatively, the first user 11 can manually input the IP address, as more fully described below, to send a videoconference call to an H.323-compliant endpoint (not shown). The first transcapture module 13 and the H.323-compliant endpoint will then conduct the call. The second transcapture module 14 will receive a message that it is receiving a call. If the second transcapture module 14 is turned off or is set to refuse incoming calls, a message will be sent to the first transcapture module 13 indicating that the second transcapture module 14 is not taking calls. If the second transcapture module 14 is set to receive calls, then the call will commence. The description above can employ a single DS server 71 connecting transcapture modules to end users anywhere in the world. The multiple server system shown in FIG. 4 demonstrates a preferred embodiment for the present invention. Multiple DS servers can be arranged geographically, as shown in FIG. 4, or in any other suitable organization; e.g., business, government, education, etc. Thus, by way of example, one local DS server 71 serves a geographic region, such as the U.S.A., a second local DS server 73 serves Asia, and a third local DS server 74 serves Europe. The local DS servers, 71, 73 and 74, are connected to each other via remote synchronization Directory Service 75. Multiple local DS servers can provide greater efficiency by localizing traffic to established geographic regions. Multiple DS servers also provide redundancy, so that if one DS server experiences problems, another DS server can take its place.

The DS server 71 uses Dynamic Host Configuration Protocol ("DHCP") for Internet Protocol ("IP") and Media Access Control ("MAC") addressing to map addresses and work behind Network Address Translation ("NAT") systems. The Directory Service system operates either by means of a pure IP address for another endpoint device or any other H.323 endpoint, or by means of backend servers that use Lightweight Directory Assistance Protocol ("LDAP") servers to map numbers to IP addresses. The DS server 71 identifies the first transcapture module 13 by its IP address, MAC address, and a unique commercial identifier ("CID") embedded in the firmware of the transcapture module 13. The CID is a 24-bit code placed in the transcapture module memory during manufacture and stored in the memory of the DS server 71. The CID is inserted in the Ethernet data packet so that the DS server can identify and recognize the particular unit in the DS server's system. The DS server will compare the specific unit to an address table and recognize it. This recognition function of the present invention allows the DS server to provide specialized directory, firmware update, Public IP, and automatic commercial download services, as more fully described below.

Figure 6:
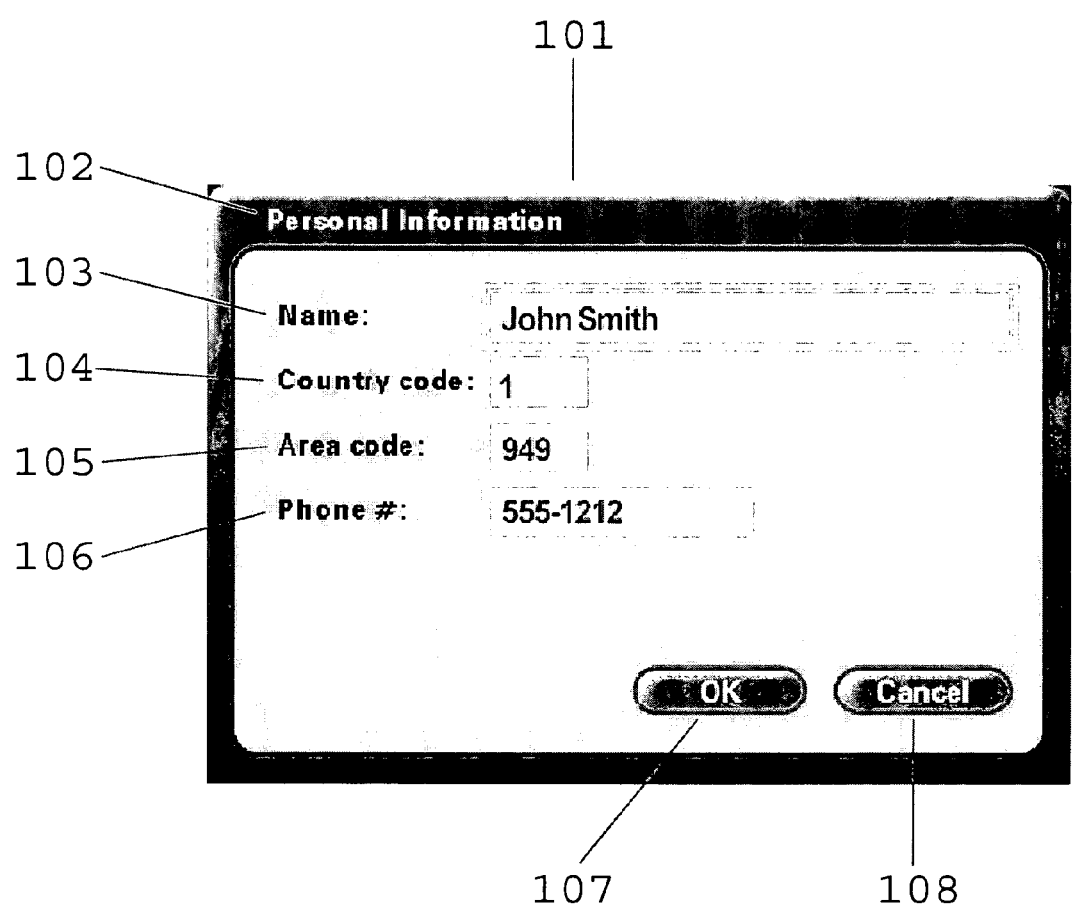
FIG. 6 is an example of dialog box to record personal information to be associated with a specific transcapture module.

When a transcapture module 13 is first set-up, an internal central processing unit ("CPU") records certain information. As it relates to the present invention, the first step is to record information about the individual transcapture module 13 and transmit that information to the DS server 71, which will store it. FIG. 6 shows the personal information screen 101 generated during set-up. When the transcapture module 13 is turned on for the first time, it is programmed to start a set-up sequence. The personal information screen 101 contains a heading 102 and dialogue boxes for the name and telephone number to be associated with the transcapture module 13. The name 103 input will provide the word identification for the module 13. The country code 104, area code 105, and local telephone number 106 input in these dialogue boxes will provide the telephone number identification for the module 13. Buttons to approve the inputs, "OK" 107, or cancel them 108, are provided. This telephone number information does not rely on or connect the transcapture module 13 to a telephone system; rather, it is used as a globally accepted identification system that people are familiar with and experienced at using. Once the information is entered, it is stored in the module's 13 memory and transmitted to the DS server 71 during system initialization, along with the MAC and IP addresses for the module, and the DS server 71 stores the information in an address table. Thereafter, the first transcapture module can be found by the DS server 71 by reference to that telephone number. Similarly, a second transcapture module 14 can be found by the DS server 71 by reference to the telephone number it has registered. Thus, the modules of the present invention can be identified and found, and videoconference calls can be placed to and from them, by reference to easily understood telephone numbers. Otherwise, the user 11 must use an IP address, which is more cumbersome and awkward to use and remember. But, the transcapture module 13 does not use telephone lines to place calls. By relying on the H.323 protocol, the transcapture module 13 and DS server 71 need an IP address to place a call.

As noted above, after the DS server 71 stores the personal information 101 and creates an address table to relate the telephone number to the unit's MAC and IP addresses using DHCP IP addressing. Without DHCP, the IP addresses must be entered manually at each endpoint. If a unit is part of a network, then IP addresses may change, making it difficult to identify the unit in order to place or receive a call. Similarly, if a unit is moved within a network, a new IP address will be assigned. DHCP allows a network to distribute IP addresses from a central point and automatically sends a new IP address when a computer is plugged into a different place in the network. In the present invention, the DS server 71 maps the registered telephone number recorded in the personal information dialogue 101 to any DHCP MAC/IP address, so that the user 11 need only enter use the telephone number during operation. As more fully described below, the transcapture module 13 is embedded with a Commercial Identification code ("CID"), which also identifies the individual module apart from any MAC, IP or telephone address. In summary, the transcapture module 13 and DS server 71 use telephone numbers to map MAC and IP addresses.

Figure 7:
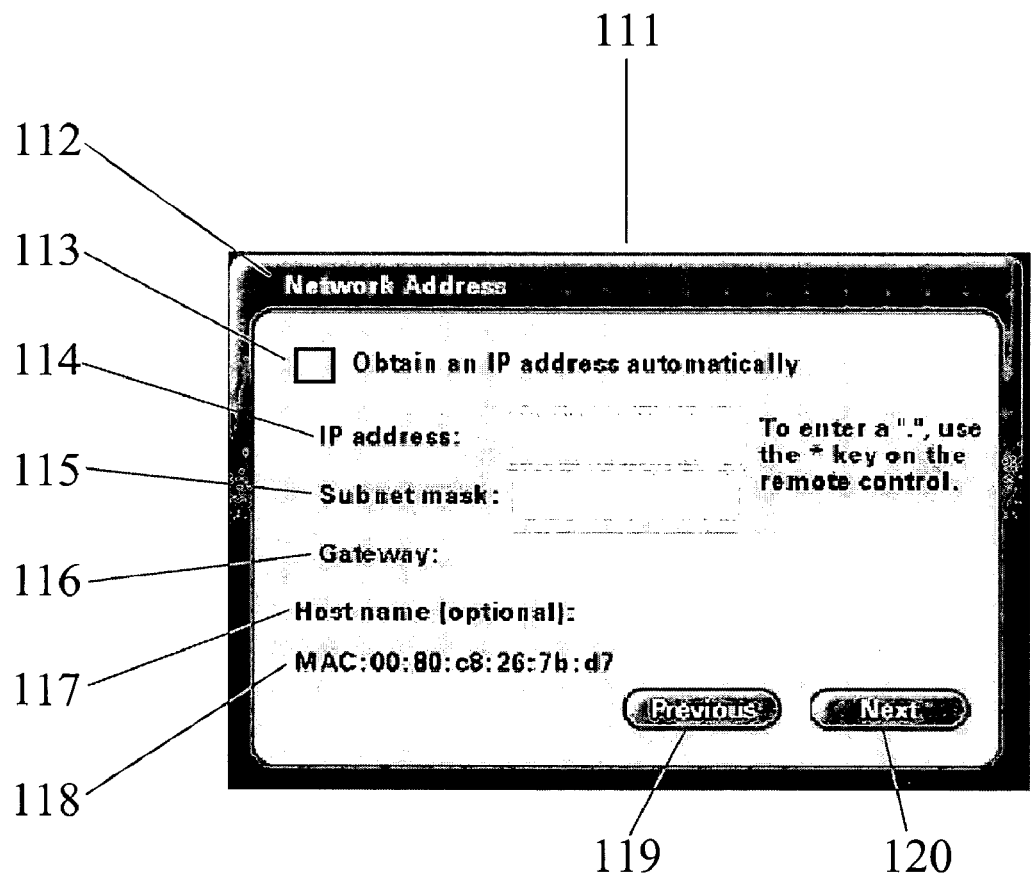
FIG. 7 is an example of a dialog box to enable the Firmware Update Service feature of the present invention.

To obtain its IP address and configure the transcapture module 13 within a local network, the module generates a Network Address screen 111, as seen in FIG. 7, upon system initialization. The information acquired is needed to connect the module 13 over the Internet 25 to the DS server 71. The screen 111 shows a heading 112 and has dialogue boxes. The user's 11 IP address can be checked by the transcapture module 13 automatically 113, or it can be entered manually 114. The module 13 will attempt to obtain the IP address from the Dynamic Host Configuration Protocol (DHCP) server. If the module 13 cannot be assigned an IP address automatically through a DHCP server, then the other information is required. The IP address 114, Subnet mask 115, and Gateway 116 are provided by a router, Internet Service Provider ("ISP") or network administrator. The transcapture module 13 also contains a Media Access Control (MAC) identifier 118, which is a unique identification for the Ethernet hardware of the transcapture module 13. An Internet Service Provider (ISP) may require a user 11 to provide a host name to connect to the Internet 25. If this is required, the present invention can assign as a "Host Name" 117. Once the network address information is provided, the user 11 selects the "Previous" 119 or "Next" 120 buttons to continue the set-up process.

Figure 8:
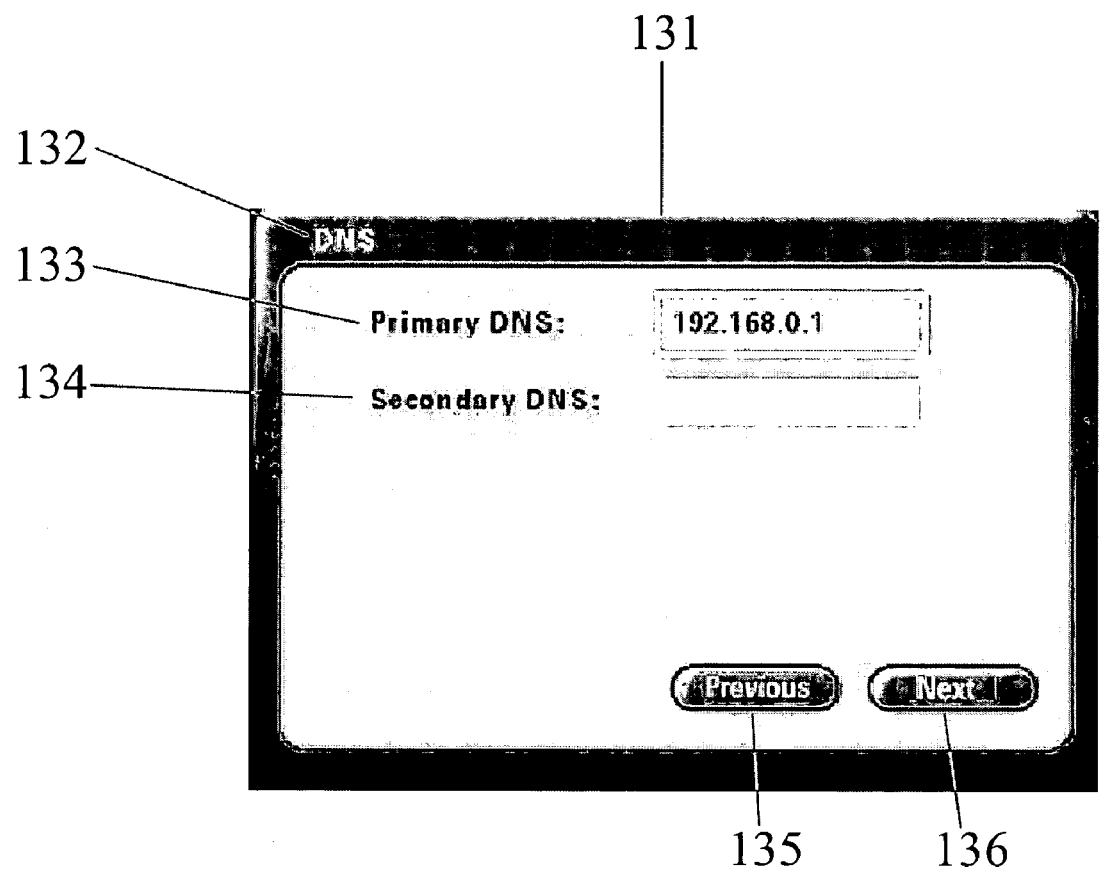
FIG. 8 is an example of a dialog box to record DNS information to be associated with a specific transcapture module.

As shown in FIG. 8, if an IP address is entered in the Network Address screen 111, a Domain Name System (DNS) server address may be required during set-up. A DNS screen 131 is provided to input this information. The screen 131 contains a heading 132 and dialogue boxes for a primary DNS 133 and secondary DNS 134. The DNS will translate an Internet domain name (e.g., www.d-link.com), which may be easier for people to use and remember, into an IP address, which is needed for the H.323 protocol. Once the DNS information is provided, the user 11 selects the "Previous" 135 or "Next" 136 buttons to continue the set-up process.

Figure 10:
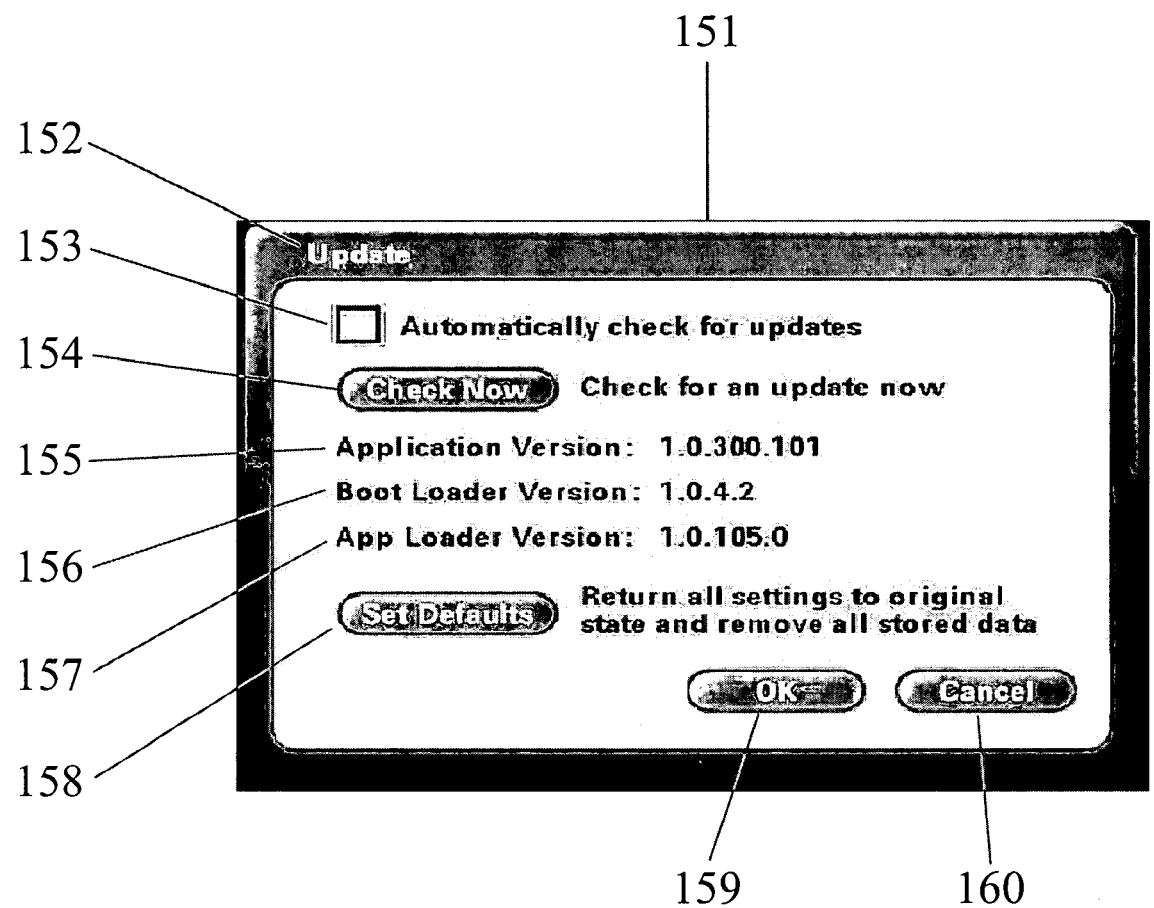
FIG. 10 is an example of a dialog box to enable the Firmware Update Service feature of the present invention.
Figure 11:
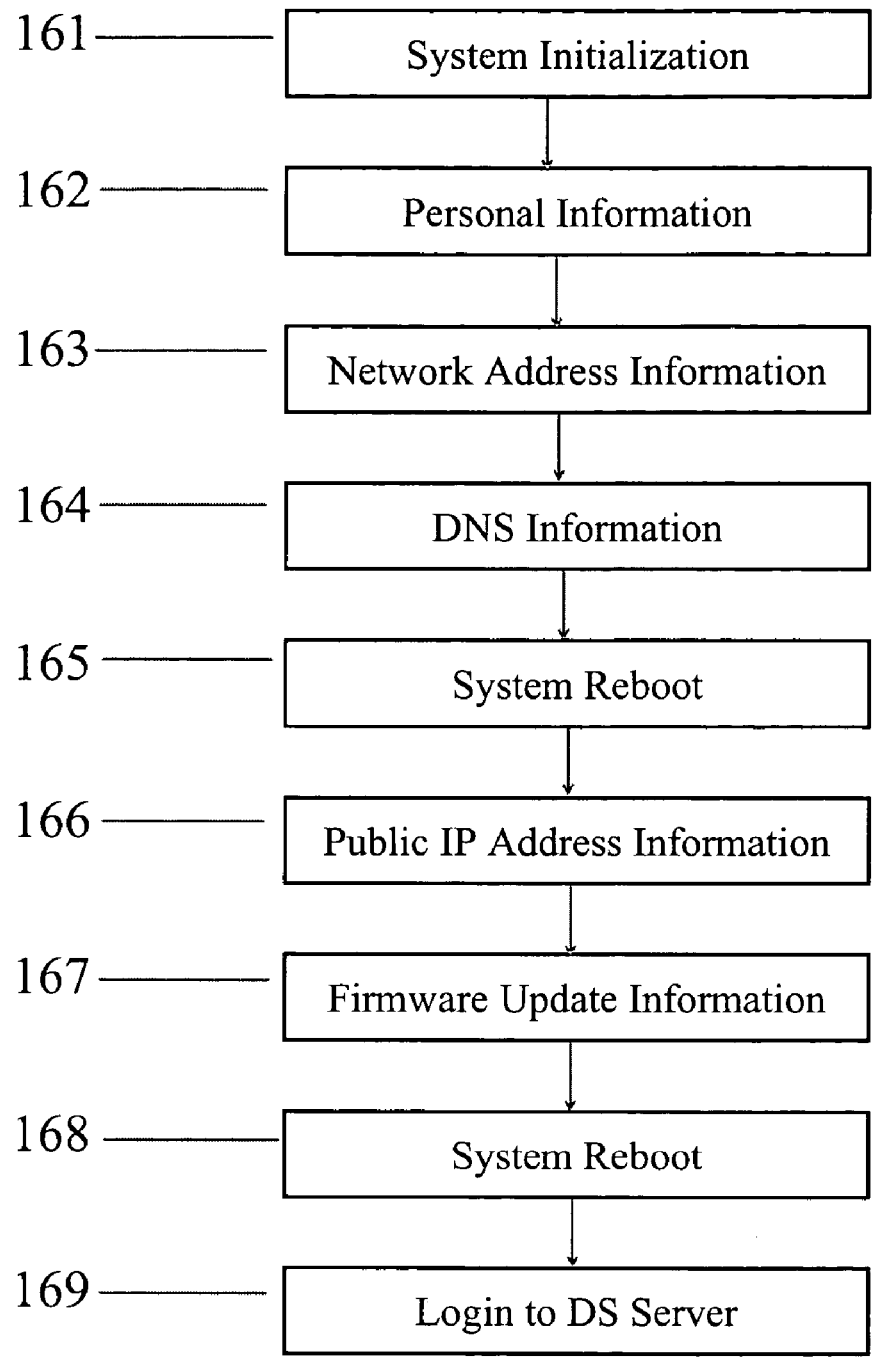
FIG. 11 is an examplary block diagram showing the system initialization sequences of the present invention.

FIG. 11 shows the sequence of system set-up and initialization. The personal information 162 described with respect to FIG. 6 is entered. Next, network address information 163 is input, as discussed with respect to FIG. 7. Then, DNS information 164 is entered, as discussed above with respect to FIG. 8. Following this set-up phase, the transcapture module reboots 165. Other information is necessary for set-up. As discussed below with respect to FIGS. 9 and 10, Public IP address information 166 and firmware update selection 167 is required. With this information, the transcapture module can be rebooted 168, to preserve the provided settings, then the transcapture module 13 is ready to login 169 to the DS server 71.

Figure 9:
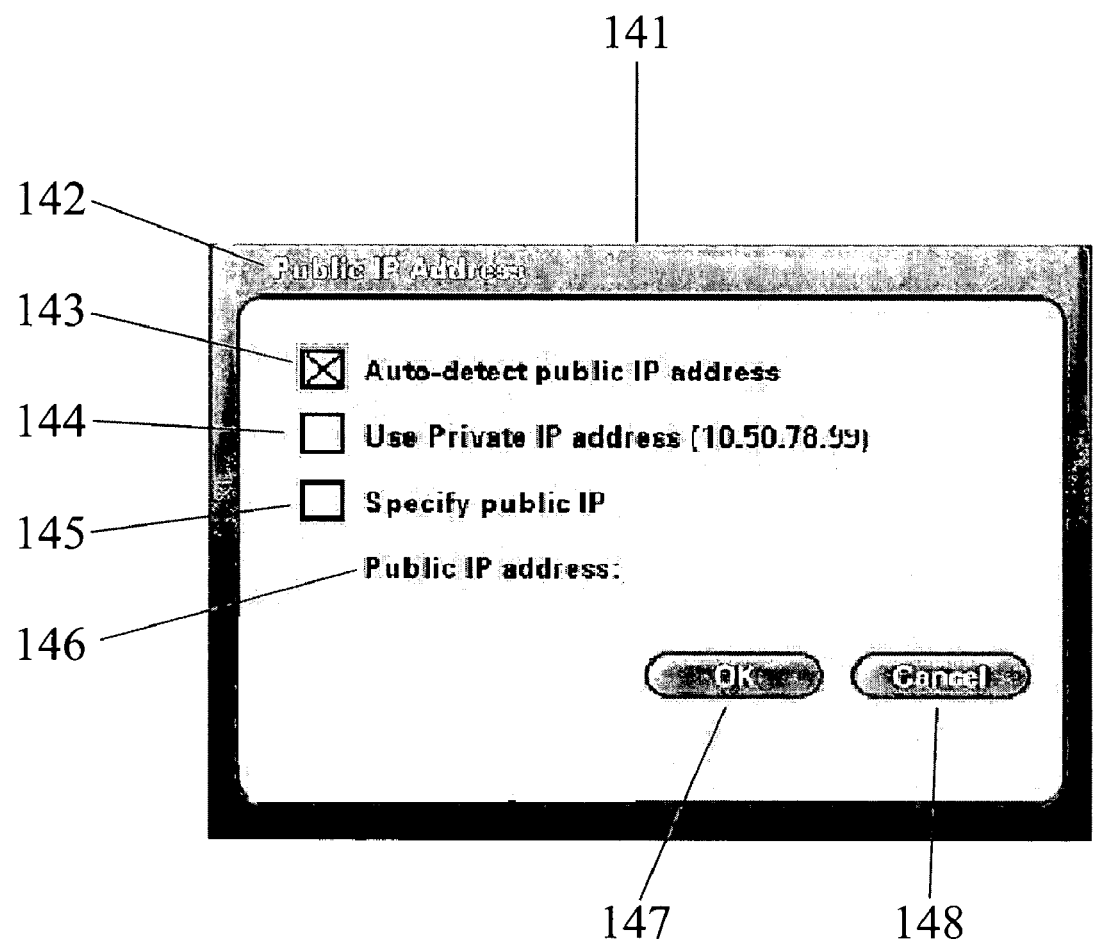
FIG. 9 is an example of a dialog box to enable the Public IP Service feature of the present invention.

The public IP address settings for the present invention are now discussed in reference to FIG. 9. To use the H.323 protocol for videoconferencing, IP addresses are used so that one endpoint can connect to another endpoint. To make this connection within a private network, such as a Local Area Network ("LAN"), the endpoints within the private network will be assigned private IP addresses that are not available outside the private network. In this case, users within the private network cannot send or receive calls outside the private network. During set-up, the transcapture module 13 will generate a screen 141 displaying for a Public IP Address heading 142. If the module 13 is used within a private network, the user can direct the it to use a private IP address 144. To place a videoconference call over the public Internet 25, the H.323 protocol needs a transcapture module's 13 public IP address. Most broadband cable and DSL modems 23 can provide the public IP addresses to the transcapture module 13. Thus, with most systems, the transcapture module 13 can be set to detect the public IP address automatically 143. If the transcapture module 13 shares its broadband cable/DSL connection 23 with another device, such as a computer, it is usually necessary to use a broadband router 22 to accomplish the sharing. Other similar devices include switches, hubs, gateways, and the like. Most commercially available broadband routing devices 22 have Network Address Translation (NAT) capabilities. The NAT affects the public IP address of the transcapture module 13 and any other device, such as a PC, sharing the broadband connection 23. Thus, selecting the "Auto-detect public IP address" options directs the transcapture module to update its public IP address through these systems. Because public IP addresses are changed regularly, the module 13 will perform this update check periodically and whenever it boots up. Alternatively, a user can choose to specify a public IP address 145 and enter it manually 146. The transcapture module 13 will then be set to this specific public IP address, and any change must be manually entered, or the module will not be able to make a connection using the H.323 protocol. After the public IP address information is selected, the user can accept the choices, "OK" 147, or "Cancel" 148 them.

It will be appreciated from FIGS. 6 through 9, and from the discussion, that the transcapture module 13 will relate its assigned "telephone number" identification, shown in FIG. 6, to its private or public IP address, shown in FIGS. 7 and 9. The transcapture module 13 can also be deployed in a network infrastructure, such as a LAN, with Dynamic Host Configuration Protocol (DHCP) IP Addressing. DHCP is a communications protocol that lets network administrators manage centrally and automate the assignment of IP addresses in an organization's network. Using the Internet Protocol, each machine that can connect to the Internet 25 needs a unique IP address. When an organization sets-up its computer users with a connection to the Internet, an IP address must be assigned to each machine. Without DHCP, the IP address must be entered manually at each computer and, if computers move to another location in another part of the network, a new IP address must be entered. As discussed more fully below with respect to FIG. 5, the presence of a gateway, router or firewall, may also affect the assignment of public IP addresses. DHCP lets the network administrator supervise and distribute IP addresses from a central point and automatically sends a new IP address when a computer is plugged into a different place in the network. The DHCP service is dynamic in nature; the directory service of the present invention allows the transcapture module 13 and DS server 71 to map the "telephone address" identification, shown in FIG. 6, to any DHCP IP address so that the transcapture module 13 can work behind a router or NAT.

Figure 12:
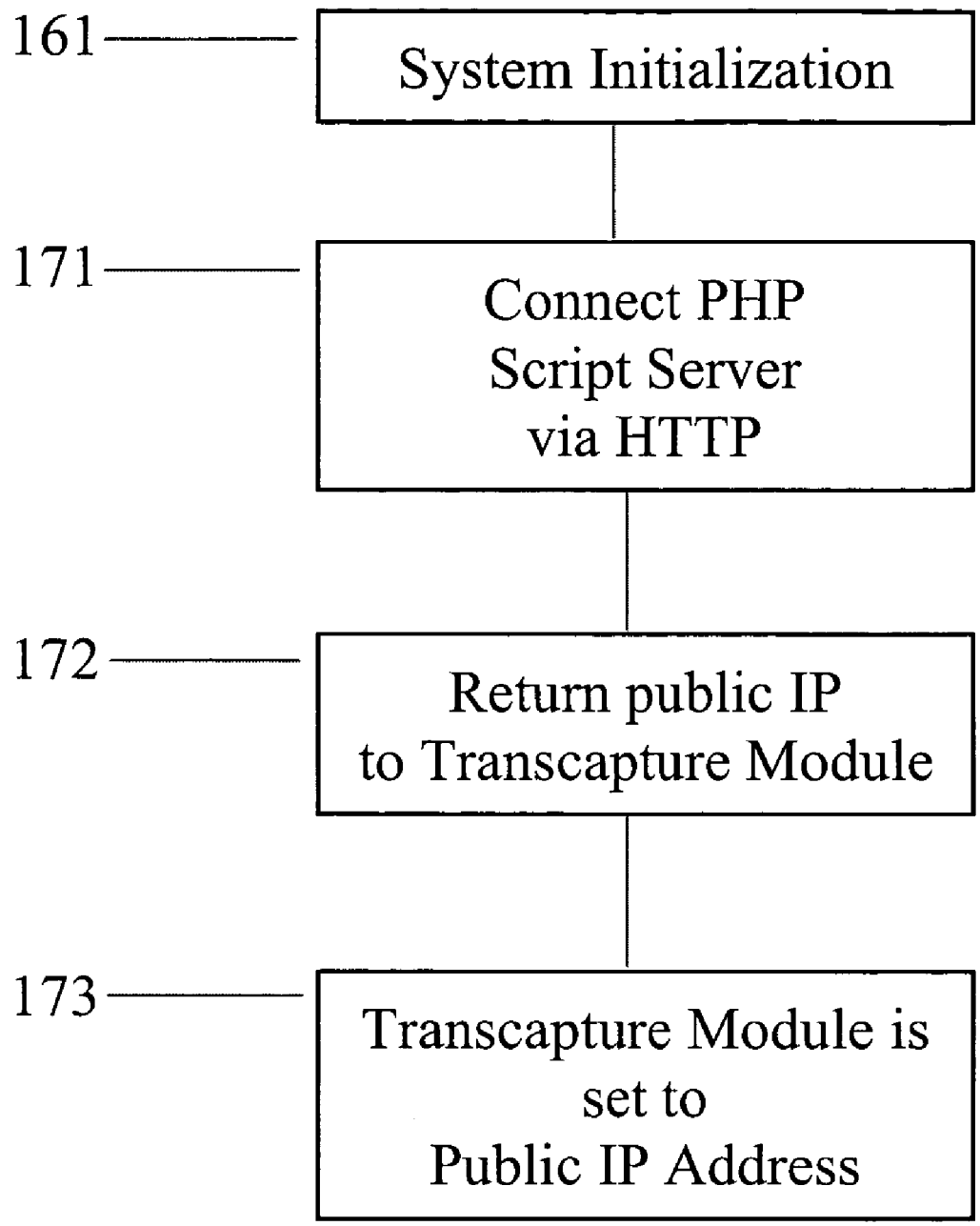
FIG. 12 is an examplary block diagram showing the Public IP Service feature of the present invention.

FIG. 12 shows the steps taken to set the transcapture module 13 to a public IP address. Upon system initialization 161, the transcapture module 13 connects the Hypertext Preprocessor (PHP) script server via the Hypertext Transfer Protocol 171. PHP is a server-side, cross-platform, HTML-embedded scripting language software, used for dynamic web communications. HTTP is a client-server TCP/IP protocol used on the World-Wide Web for the exchange of Hypertext Markup Language (HTML) documents. The Transmission Control Protocol over Internet Protocol (TCP/IP) has become the standard Ethernet protocols for internetworking and includes both network layer and transport layer protocols. Thus, the transcapture module 13 will connect 171 to the script server and receive in return a public IP address 172. The module 13 is then set to the received public IP address 173, and is ready to login to the DS server 71 and register its "telephone number" address, make or receive a call, receive automated commercial downloads, or update its firmware.

Figure 13:
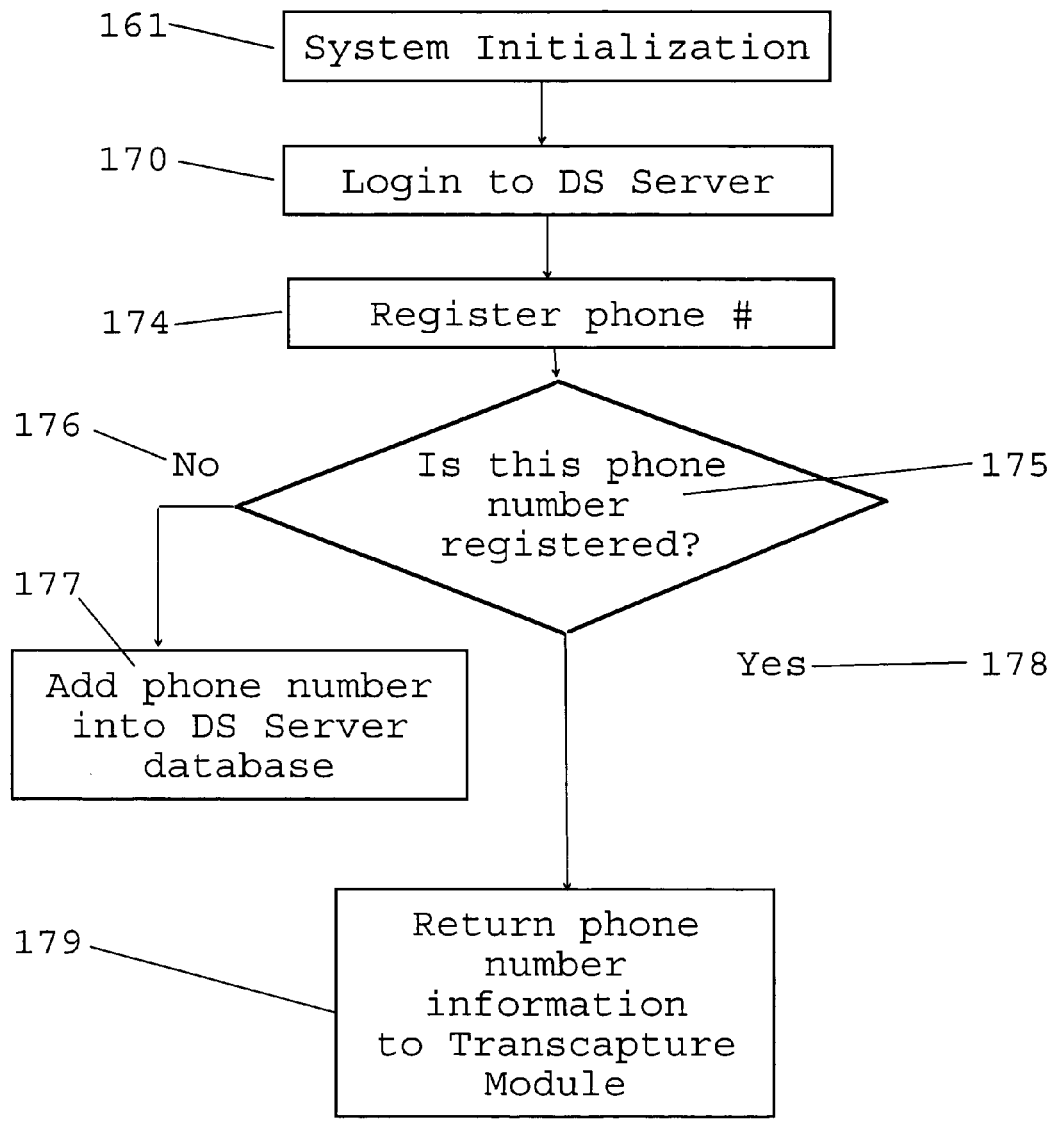
FIG. 13 is an examplary block diagram showing the Directory Service feature of the present invention.

The process for registration of the transcapture module's 13 "telephone number" address with the DS server 71 is shown in FIG. 13. After system intialization 161, the transcapture module 13 logs in 170 to the DS server 71. In the point-to-point broadband connection between the module 13 and the DS server 71, the DS server 71 will receive the public IP address of the module 13. The transcapture module 13 provides 174 its "telephone number" address to the DS server 71. The DS server 71 looks 175 in its address table to determine whether the "telephone number" has already been registered. If the DS server 71 finds the "telephone number" 178 in its address table, it will acknowledge 179 the transcapture module 13 and update the server's 71 database to reflect the module's 13 current IP address. If the DS server 71 does not find the "telephone number" 176 in its address table, it will add the "telephone number" into its address table database 177 as a new record, along with the module's 13 IP address. Thereafter, anytime the user 11 turns on the transcapture module 13, the DS server 71 will recognize the "telephone number" address. When another transcapture module 14 places a videoconference call to the first transcapture module 13, by entering the "telephone number" for the first user 11, the DS server 71 will find that "telephone number" and associated IP address in its address table database, and the server 71 will attempt to establish an H.323 protocol connection with the first transcapture module 13.

Figure 5:
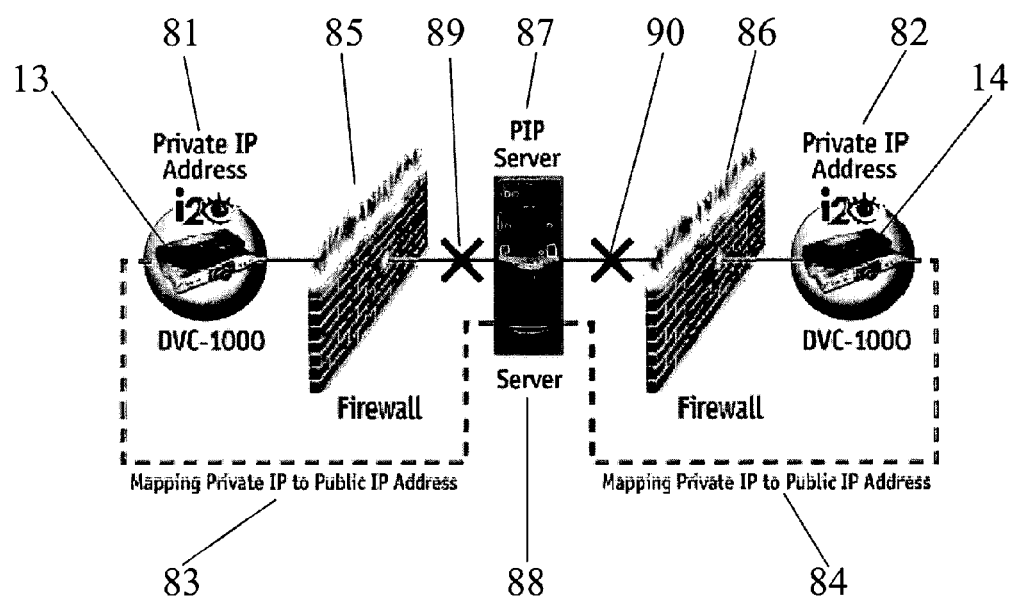
FIG. 5 is a diagram of the mapping function of the PIP server behind the GRF architecture of the present invention.

Referring to FIG. 5, a transcapture module 13 can also be deployed in a network infrastructure that offers Dynamic Host Configuration Protocol ("DHCP") IP Addressing. DHCP is a communications protocol that lets network administrators manage centrally and automate the assignment of IP addresses in an organization's network. Using the Internet Protocol, each machine that can connect to the Internet needs a unique IP address. When an organization sets-up its computer users with a connection to the Internet, an IP address must be assigned to each machine. Without DHCP, the IP address must be entered manually at each computer and, if computers move to another location in another part of the network, a new IP address must be entered. DHCP lets the network administrator supervise and distribute IP addresses firm a central point and automatically sends a new IP address when a computer is plugged into a different place in the network. The DHCP service is dynamic in nature; the directory service of the present invention is able to map 83 the "telephone" address to any DHCP IP address 81 so that the transcapture module can work behind a gateway, router or firewall 85. When a first transcapture module 13 logs in to the server 88, the Public IP address 87 information is mapped 84 and updated. Similarly, if second transcapture module 14 is logged, it has updated its IP address 82 information. The server 88 will have updated its address table, so that the addresses for each module, 13 and 14, will be current and active. With the current information, the server 88 is able to overcome the barriers 89 and 90, created by the GRFs, 85 and 86, to establish a point-to-point connection.

Figure 16:
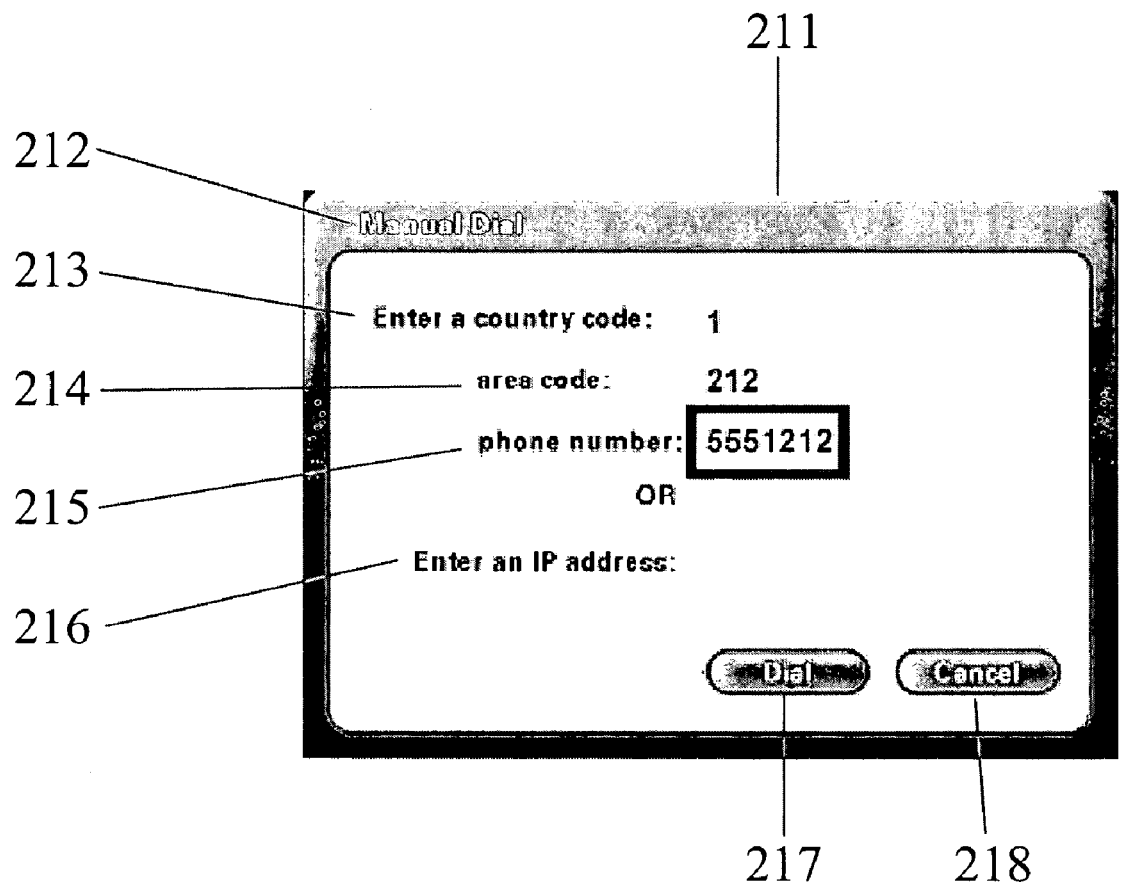
FIG. 16 is an example of a dialog box to enable the manual dialing function of the present invention.
Figure 17:
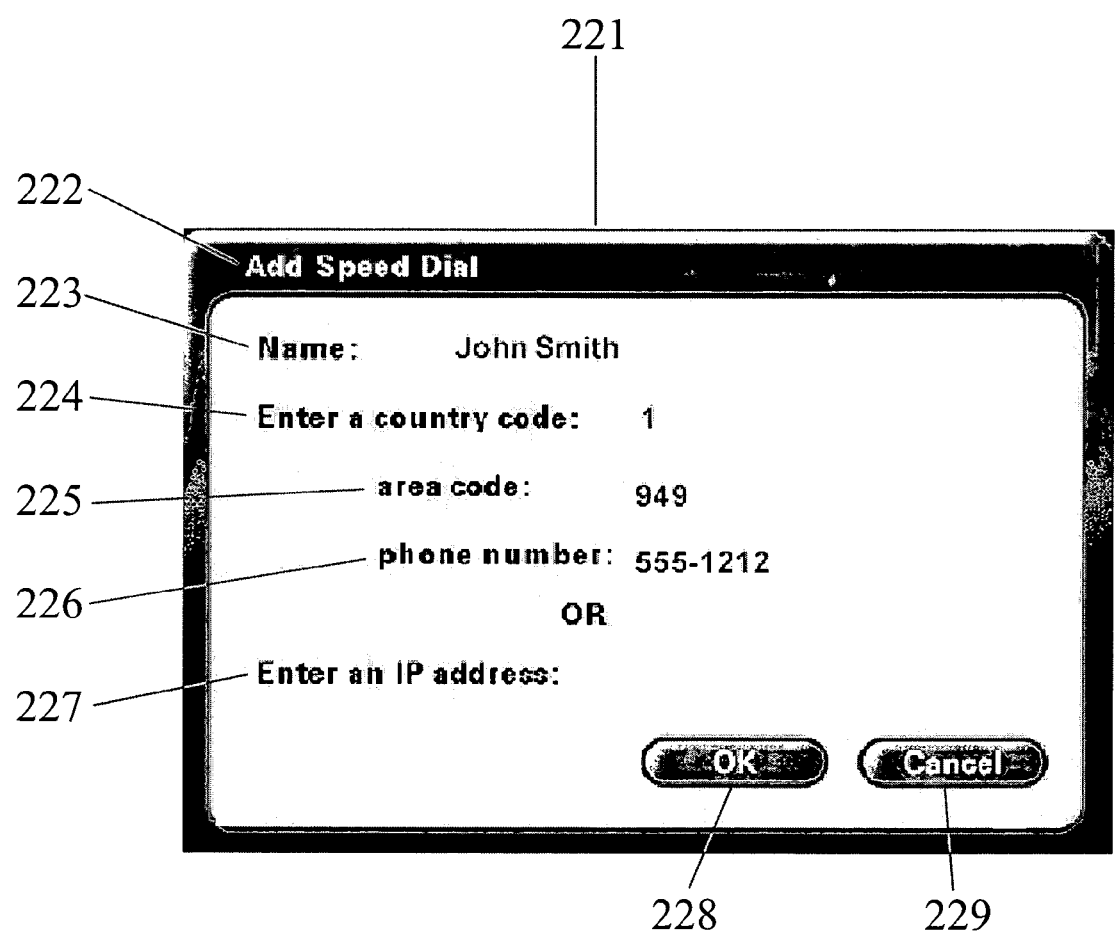
FIG. 17 is an example of a dialog box to add speed dialing listings to the speed dial function of the present invention.
Figure 18:
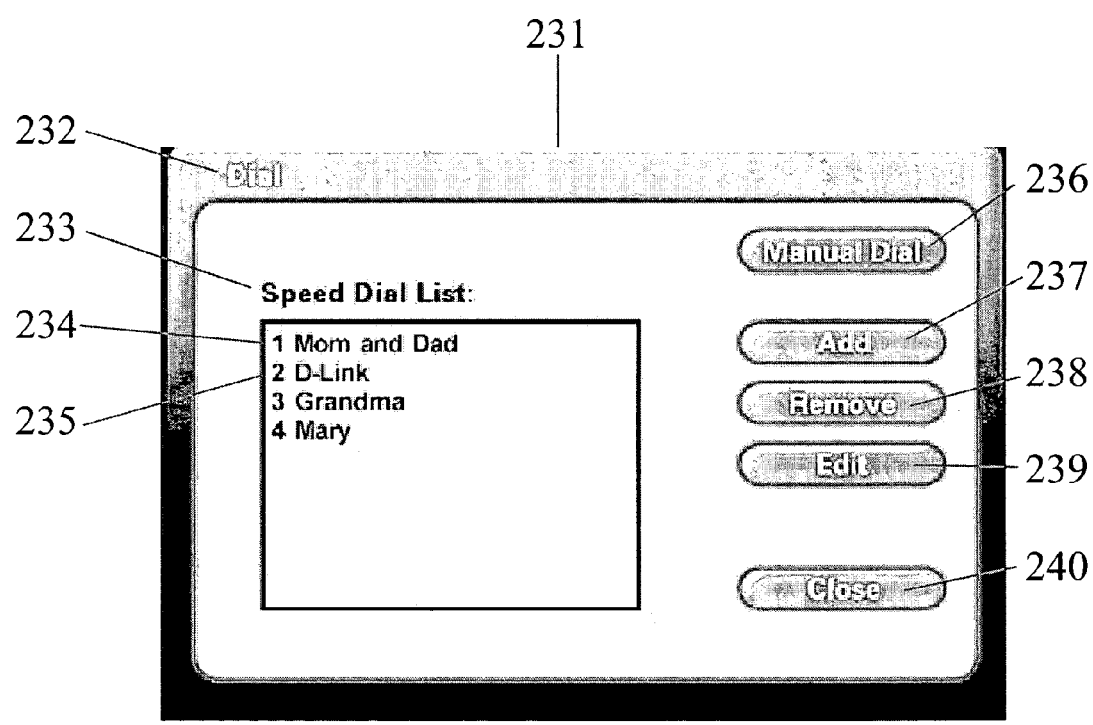
FIG. 18 is an example of a dialog box to enable the speed dialing function of the present invention.

FIGS. 16 through 18 show how a transcapture module stores "telephone numbers" and IP addresses. As shown in FIG. 16, a screen 211 generates a "Manual Dial" 212 dialog. Dialog boxes for country code 213, area code 214, and telephone number 215 are provided. With a telephone number entered, a user initiates a videoconference call over the Internet 25 by clicking the "Dial" button 217. Thus, if the first user 11 completes the steps of system intialization, "telephone number" registration, and login, the DS server 71 will find the first transcapture module 13 in its address table database and update the IP address for that module 13. Next, the DS server 71 will take the "telephone number" entered in the Manual Dial screen 211 and look for it in its address table database. If it finds the "telephone number", it will place the videoconference call by using the IP address related to that "telephone number" to establish a point-to-point connection over the Internet 25. The videoconference call takes place using the H.323 protocol. Alternatively, the first user 11 can manually enter an IP address 216 for the second transcapture module 14 in the Manual Dial dialog box 211, then click the "dial" button 217. The videoconference call will then be attempted without the directory service step set forth above.

FIGS. 17 and 18 show how "telephone numbers" or IP addresses can be stored by a transcapture module and accessed through a "Speed Dial" system. FIG. 17 shows a screen 221 to add a speed dial 222 number. The screen 221 includes dialog boxes for an addressee's name 223, country code 224, area code 225, and telephone number 227. Alternatively, the addressee's IP address can be entered 227. The user then clicks "OK" 228 or "Cancel" 229 to save or cancel the addressee information. FIG. 18, shows the screen 231 for the dial 232 function. The user can choose to dial manually 236, as described above with respect to FIG. 16, add an addressee to the speed dial list 237, as described immediately above with respect to FIG. 17, remove an addressee from the speed dial list 238, edit information entered in an addressee's speed dial information 239, or close out of the dial function 240. The screen 231 provides a list 233 of speed dial addressees, identified by the names, e.g., 234 and 235, entered in dialog box 223 of the add a speed dial screen 221. Thus, to use the speed dial function, the user double clicks on one of the addressees listed in the speed dial list 233.

As noted above, the transcapture module 13 of the present invention is a stand-alone device. Unlike commercially available systems, the present invention does not connect to the Internet through a computer. However, without a computer keyboard, the process of entering information must be provided in another way. One such way is to use a hand-held remote control device, as shown in FIG. 21. The remote control 261 has a standard number pad 262 for entering and selecting numbers. For example, in the Personal Information dialog box 101, shown in FIG. 6, the telephone numbers can be entered through the number keypad 262 of the remote control 261. The name information 103 requested in the Personal Information dialog box 101, which requires letters rather than letters, is entered through a letter display generated by the transcapture module 13 on the television 13 connected to the module; using the arrow keys 267 of the remote control 261, the user 11 moves a cursor to a letter and selects it by pushing the "ENTER" key 266 of the remote control 261. The asterisk key 264 can be used for entering periods, which are sometimes needed. The remote control also includes a number sign 263, "CANCEL" 265 and contrast 269 keys, as well as keys to select a speakerphone mode 268, different screen set-up options (full-screen or picture-in-screen modes) 271, viewing options (self-view or remote view) 272, audio mute 270, and video mute 273.

Figure 20:
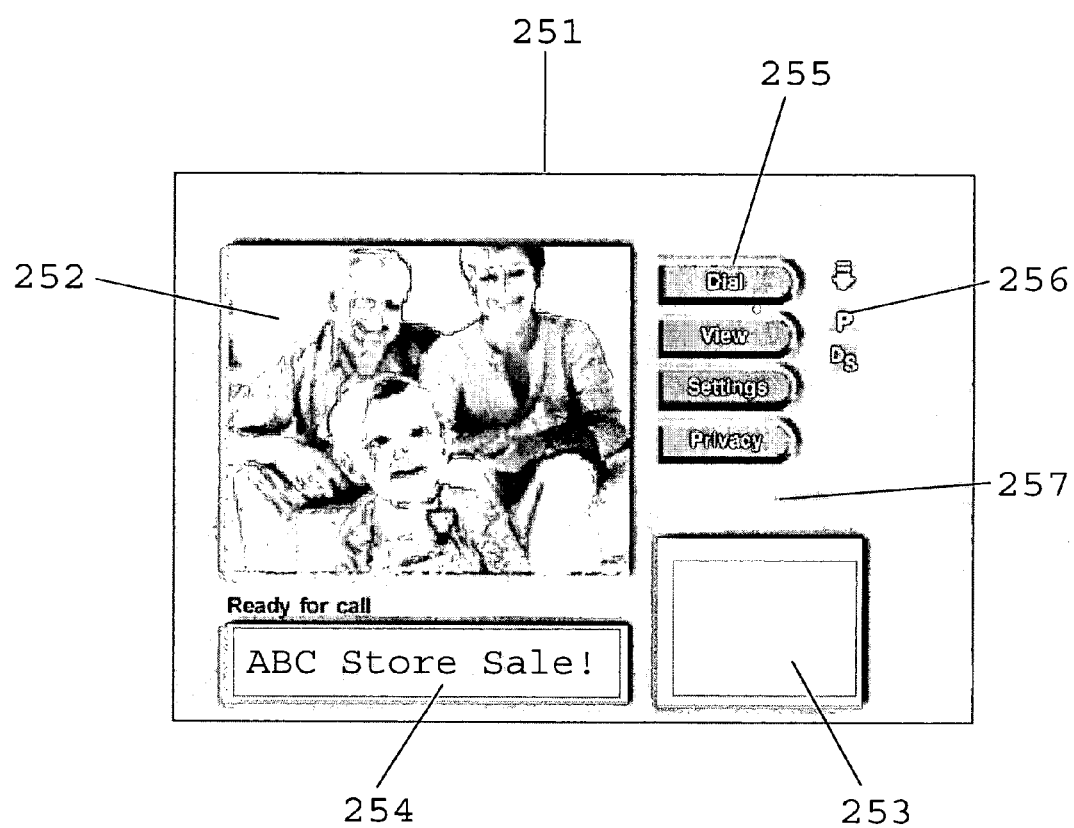
FIG. 20 is an example of the television screen fields of the present invention.

In the preferred embodiment of the present invention, as seen in FIG. 20, the television screen 251 has several fields. The main video field 252 provides a self-view when no videoconference is in session, then displays the remote viewer when a call takes place. The smaller field 253 provides a self-view when a videoconference call is in session. The bottom field 254 provides bannerization space, as more fully described below. The settings field 255 provides dialing (i.e., manual, speed, add, etc.), viewing (i.e., remote-view plus self-view, full-view only, etc.), settings (i.e., personal information, network, firmware update, etc.), and privacy options (i.e., audio privacy, video privacy, and "Do Not Disturb). The status of privacy options chosen (bright) or not chosen (grayed) are indicated by icons in the privacy status field 257. A status field 256 indicates when the transcapture module is performing certain functions. If the module is looking for firmware updates, as more fully described below, the down arrow icon of this field 256 will light-up. Similarly, if the module is obtaining a public IP address, the "P" icon will illuminate, and if the module is registering with the directory service, as described above, the "DS" icon will illuminate.

Figure 19:
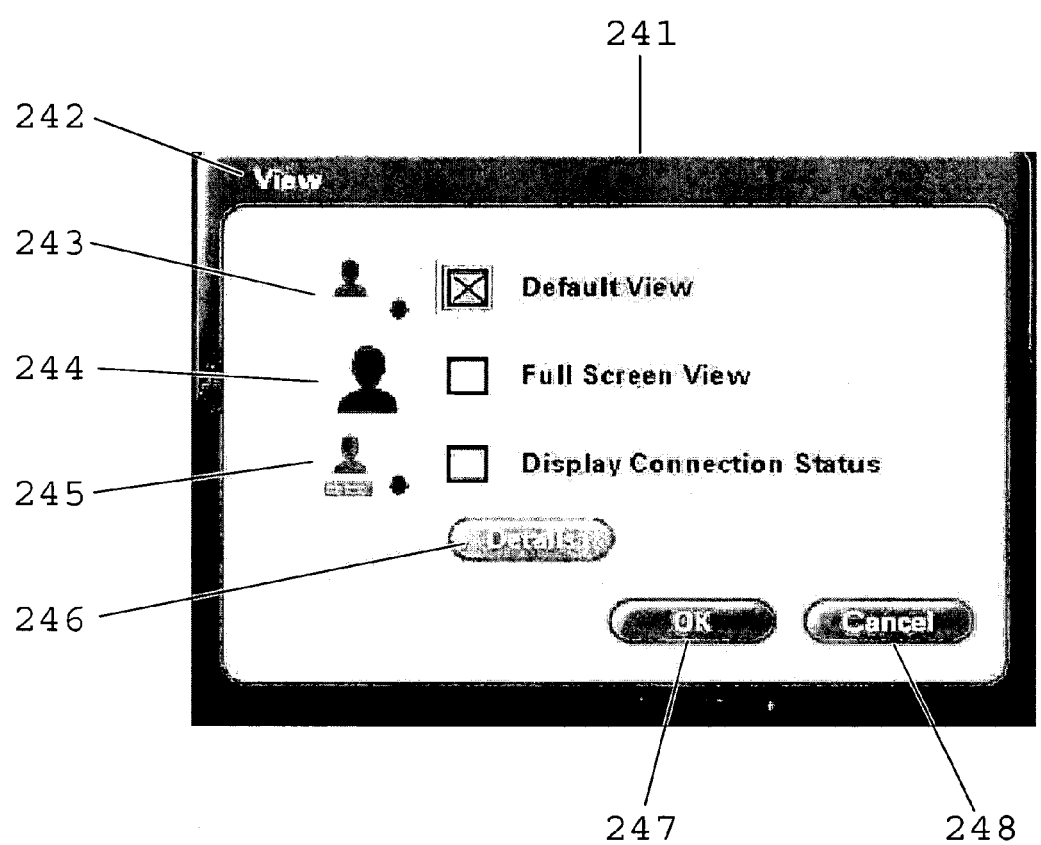
FIG. 19 is an example of a dialog box to enable the viewing options of the present invention.

FIG. 19 shows the screen 241 for selecting viewing options 242. The user can select a "default" view, such as a view with all the fields shown in FIG. 20, described above. Or, the user can select a full-screen view 244 showing the main video field; a self-view is displayed when no call is in progress and the remote viewer is displayed during a call. The user can also select a connection status field 245. A "Details" 246 field provides information concerning the connection, such as the video and audio formats and call rates.

Figure 14:
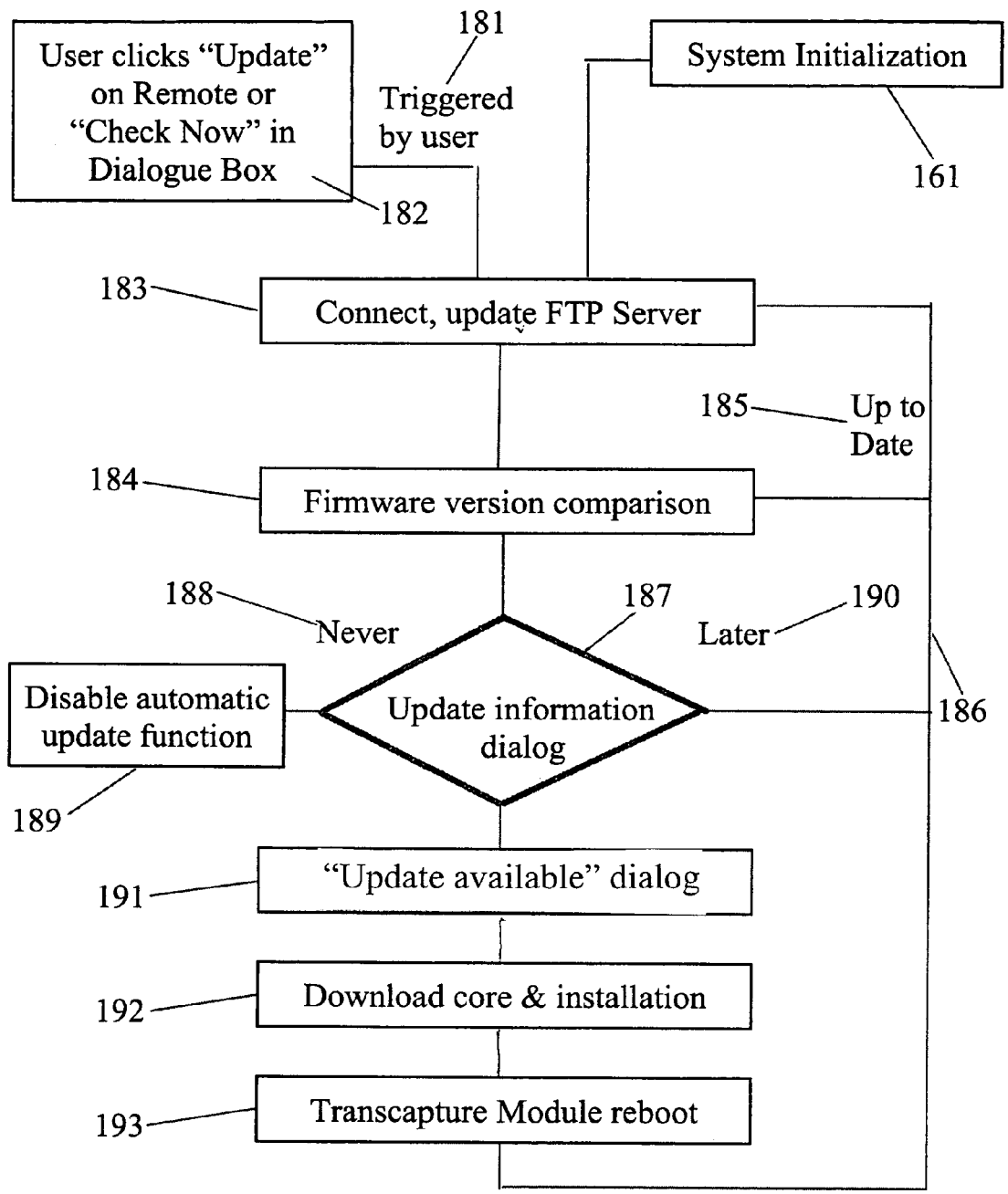
FIG. 14 is an examplary block diagram showing the Firmware Update Service feature of the present invention.

Referring now to FIGS. 10 and 14, the transcapture module 13 has the capability of communicating with the DS server 71 and receiving updates for the module's firmware. FIG. 10 shows an example of a screen 151 providing firmware update 152 options. The user can select the "Automatic check for updates" dialog box 153, and the module 13 will periodically check with the DS server 71 for firmware updates, including whenever the module 13 is turned on. The screen 151 provides information concerning the module's current Application 155, Boot Loader 156, and Application Loader 158 versions. The user can specifically request a firmware update check 154, which will prompt the module 13 to check with the DS server 71 for any firmware updates. The user can also restore the module 13 to its factory settings, by selecting "Set Defaults" 158. Once the user has made a selection, the selected option can be enabled by clicking "OK" 159, or discarded by clicking "Cancel" 160. FIG. 14 shows the steps taken when the module 13 checks for an update. If the automatic update check 153 is selected, during system initialization 161, the module 13 will connect with the File Transfer Protocol (FTP) server 183. The FTP is a client-server protocol that assists in the transfer and execution of files over a TCP/IP network. The module 13 communicates its firmware version information (e.g., 155, 156 and 157), to the DS server 71, which compares the firmware information with the most current firmware and determines whether the module's firmware is up to date 184. If the automatic firmware update check 153 is not enabled, the steps above can be triggered manually by the user, by selecting the "Check Now" dialog box 154 of the firmware update screen 151. If the firmware comparison 184 shows that module's firmware is up to date 185, the firmware update function is completed 186. If the module does not have a firmware update, an firmware update dialog 187 will take place. If the user chooses "Never" to check for firmware updates 188, or if the user chooses to download a firmware update "Later" 190, then the module will disable its automatic update function 189, and the firmware update cycle will be terminated 186. If the user chooses to proceed with the firmware update, then the user will be advised that a firmware update download is available and that downloading the update will reboot the module 191. If the user chooses not to proceed with the download and reboot, then the module will disable its automatic update function 189, and the firmware update cycle will be terminated 186. If the user chooses to proceed with the download, then the DS server 71 will transfer the firmware update files and the FTP protocol will prompt an installation 192. Once the installation is successfully completed, the module 13 will reboot 193. After the reboot 193, the firmware update cycle is completed 186.

Figure 15:
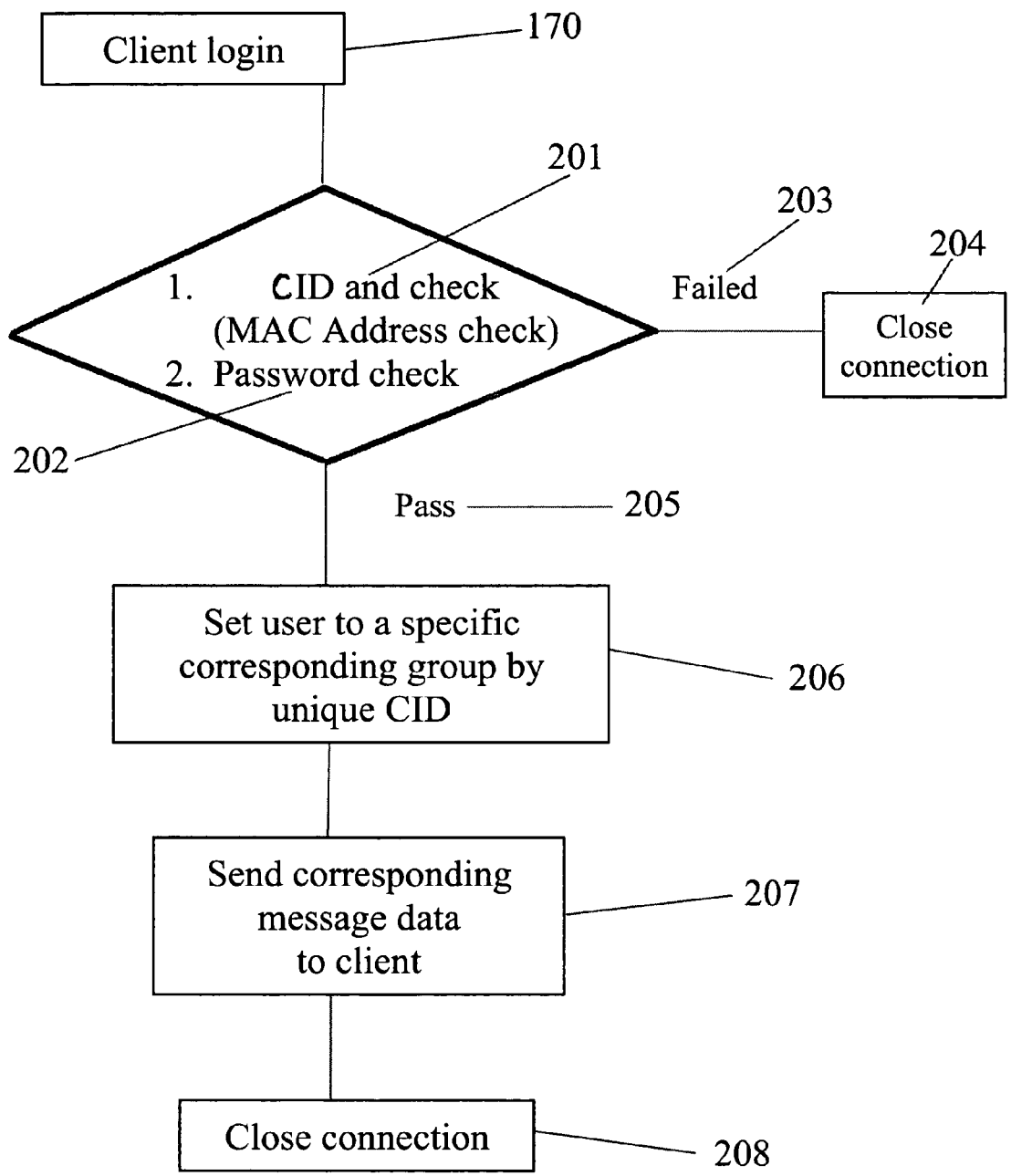
FIG. 15 is an examplary block diagram showing the Automatic Commercial Download Service feature of the present invention.

FIG. 15 shows the sequence for the Automatic Commercial Download Service (ACDS) of the present invention. Following system intialization, the transcapture module logs in to 170 the DS server 71. As described above, the DS server 71 checks the module's 13 "telephone number" and public IP address. The DS server 71 also checks the MAC Address for the module 13. A MAC Address is a unique identifier related to a piece of hardware in a network. In addition to the MAC Address, the transcapture module 13 of the present invention includes a Commercial Identification (CID) number. The CID is a unique identifier embedded in the module 13 and also stored in the DS server 71. In the preferred embodiment of the present invention, the CID is a 24 bit code embedded in the transcapture module's 13 firmware during manufacture. As more fully described below, the CID allows the DS server 71 to access the history of a specific transcapture module 13 and interact with the module. Referring back to FIG. 15, the transcapture module 13 provides its MAC Address and CID to the DS server 71, and the DS server performs a check to find the specific module 13 in the DS server's 71 database 201. Optionally, the password provided by the transcapture module 13 can also be checked 202. If either the MAC/CID Address check 201 or the password check 202 fail 203, the DS server 71 closes the connection 204. If the checks pass 205, then the DS server checks the CID in its database and determines whether the transcapture module 13 associated with the unique CID is part of a group defined in the server's database 206. If the CID is part of such a group, the DS server 71 looks for messages corresponding to the group in the server's database and sends the message 207 to the specific transcapture module 13 associated with the unique CID. Once the sequence is completed, the ACDS check is closed 208. In the preferred embodiment of the present invention, the corresponding message 207 sent to the specific transcapture module 13, is displayed in the ACDS banner field 254 provided in the television screen 251, shown in FIG. 20. By way of illustration of the ACDS feature, the banner field 254 can display a message from the store where the specific transcapture module 13 was purchased. The DS server 71 can store this information in relation to the module's unique CID. This unique identifier allows the DS server 71 to recognize a specific module 13, even though its public IP address and MAC Address may have changed. Thus, if the specific transcapture module 13 was purchased at ABC Store in Lewiston, Id., it can be defined as part of a group corresponding to modules purchased from that store. The definition can be expanded to include modules purchased from chain of stores, without relation to the specific store, or the definition can be more narrowly defined to include modules purchased from the store during certain periods of time. It will be appreciated that, by providing a unique identifier for the specific videoconferencing unit, and by providing bannerization capability to the unit, and by providing a DS server that communicates with the specific unit, it is possible to send messages to the specific unit that are uniquely targeted for it. Continuing the example above, during the Christmas holiday season, the ABC Store in Lewiston, Id., can negotiate to have the DS server 71 define a group in its database, that group being defined as all transcapture module's purchased from the store. This sales information can be tracked by reference to the specific module's CID. When the specific transcapture module 13 is manufactured, the CID is embedded in its firmware. When the module 13 is sold, the purchaser information can be stored in the DS server's 71 database by reference to the CID. Thus, with respect to the example, the DS server's 71 database will record the sale of the specific transcapture module 13 to ABC Store in Lewiston, Id. Thereafter, when the specific module 13 logs in, the DS server 71 will find the ABC Store-defined group corresponding to the specific module's 13 unique CID. If the ABC Store negotiated to have the defined group receive a holiday message announcing a sale at the store, the DS server 71 will extract the ABC Store group message from its database and send it to the specific module 13. Thereafter, the user 11 will see the ABC Store sale message in the bannerization field 254 of the television screen 251.

The drawings and description set forth here represent only some embodiments of the invention. After considering these, skilled persons will understand that there are many ways to make and put into use the videoconferencing system and processes according to the principles disclosed. The applicant contemplates that the use of alternative structures, systems and processes, which result in a videoconferencing system and process using the principles disclosed and the invention claimed, will be within the scope of the claims.

What we claim is:

1. A system for conducting videoconferences over a broadband Internet connection, comprising:
    a broadband Internet connection,
    a stand-alone transcapture module to transmit and receive video and audio signals over the broadband Internet connection, the module further comprising a video camera capable of recording images, a microphone capable of recording sound, firmware to operate the module, an IP address associated with the module's broadband Internet connection, a directory service protocol to assign a conventional telephone number to an IP address, a protocol to send module firmware version information and request and receive updates to firmware, data memory, and a commercial identification number embedded in the memory during manufacture,
    a video image monitor having a display screen and connected to the module by a visual signal cable,
    an audio speaker connected to the module by an audio signal cable,
    a broadband signal transmission connection between the module and the broadband Internet connection,
    a server having a broadband Internet connection, wherein the server further comprises an address table that maps conventional telephone numbers to IP addresses, a firmware version table, a protocol to receive firmware version information and requests for updates to firmware and send updates when the received request identifies firmware in need of an update, and an automatic commercial download service to map the commercial identification number against a direction table and send outgoing information to the module if the commercial identification number relates to available outgoing information on the direction table,
    wherein the module establishes a connection with the server through the broadband Internet connection, and wherein the module provides the server with the IP address associated with the module's broadband Internet connection and the conventional telephone number assigned to the IP address by the directory service protocol, and wherein the module provides the server with the module firmware version information and requests updates to firmware when the module firmware version is in need of an update, and wherein the module provides the server with the commercial identification number, and
    wherein the server accepts the broadband Internet connection with the module, and wherein the server receives the IP address associated with the module's broadband Internet connection and the conventional telephone number assigned to the IP address by the directory service protocol, and wherein the server maps the conventional telephone number to IP address associated with the module's broadband Internet connection in the address table, and wherein the server receives the firmware version information from the module and compares the firmware version information against the firmware version table to determine if a firmware update is available, and wherein the server sends the firmware update to the module if the firmware update is available, and wherein the server receives the commercial identification number from the module and maps the commercial identification number against the direction table, and wherein the server sends the outgoing information to the module if the commercial identification number relates to available outgoing information on the direction table.

* * * * *